United States Patent
Demeurisse et al.

(10) Patent No.: US 12,507,706 B2
(45) Date of Patent: Dec. 30, 2025

(54) STRUCTURED OIL-IN-WATER EMULSION AND FOOD PRODUCT COMPRISING THE SAME

(71) Applicant: AAK AB, Malmo (SE)

(72) Inventors: Jeroen Demeurisse, Malmo (SE); Alejandro Marangoni, Malmo (SE)

(73) Assignee: AAK AB, Malmo (SE)

( * ) Notice: Subject to any disclaimer, the term of this patent is extended or adjusted under 35 U.S.C. 154(b) by 639 days.

(21) Appl. No.: 17/442,919

(22) PCT Filed: Apr. 23, 2020

(86) PCT No.: PCT/SE2020/050411
§ 371 (c)(1),
(2) Date: Sep. 24, 2021

(87) PCT Pub. No.: WO2020/218965
PCT Pub. Date: Oct. 29, 2020

(65) Prior Publication Data
US 2022/0167638 A1    Jun. 2, 2022

(30) Foreign Application Priority Data

Apr. 23, 2019 (SE) .................................. 1930133-2

(51) Int. Cl.
| | |
|---|---|
| *A23F 5/50* | (2006.01) |
| *A21D 2/14* | (2006.01) |
| *A21D 2/18* | (2006.01) |
| *A21D 10/00* | (2006.01) |
| *A21D 13/80* | (2017.01) |
| *A23D 7/005* | (2006.01) |
| *A23F 5/24* | (2006.01) |
| *A23F 5/26* | (2006.01) |
| *A23F 5/28* | (2006.01) |

(52) U.S. Cl.
CPC ........... *A23D 7/0053* (2013.01); *A21D 2/145* (2013.01); *A21D 2/181* (2013.01); *A21D 10/002* (2013.01); *A21D 13/80* (2017.01)

(58) Field of Classification Search
None
See application file for complete search history.

(56) References Cited

U.S. PATENT DOCUMENTS

| | | | |
|---|---|---|---|
| 2,786,765 A | 3/1957 | Prince | |
| 3,958,033 A | 5/1976 | Sims et al. | |
| 2008/0299200 A1* | 12/2008 | Leser | C09K 23/017 426/534 |
| 2016/0227807 A1* | 8/2016 | Hesler | A23P 30/40 |

FOREIGN PATENT DOCUMENTS

| | | |
|---|---|---|
| EP | 0 659 347 A1 | 6/1995 |
| GB | 1 339 142 | 11/1973 |
| GB | 1 416 188 | 12/1975 |
| WO | WO 94/12039 | 6/1994 |
| WO | WO 97/38588 | 10/1997 |
| WO | WO 2005/107489 A1 | 11/2005 |

OTHER PUBLICATIONS

Marangoni: WO 2014/043778 A1 Published on Mar. 27, 2014 (Year: 2014).*
Murakami, A. et al., "Effects of sugars on the D phase emulsification of triglyceride using polyoxyethylene sorbitan fatty acid ester," J. Oleo. Sci., vol. 54, pp. 633-639 (2005).
International Search Report for International Application No. PCT/SE2020/050411, dated May 18, 2020.
Written Opinion of the International Search Authority for International Application No. PCT/SE2020/050411.

* cited by examiner

*Primary Examiner* — Patricia A George
(74) *Attorney, Agent, or Firm* — Finnegan, Henderson, Farabow, Garrett & Dunner, LLP

(57) ABSTRACT

The present invention relates to a structured oil-in-water emulsion for use in a food product, a food product, such as a bakery product, comprising the same, and a method of preparing the food product and the emulsion itself. In one aspect the present invention provides an oil-in-water structured emulsion for use in a food product; said structured emulsion comprising: i) from 1 to 8 wt. % emulsifier; ii) from 8 to 55 wt. % of sugar and/or sugar alcohol; iii) from 12 to 40 wt. % water; and iv) from 25 to 70 wt. % oil.

26 Claims, 11 Drawing Sheets a) b) c)

d)  e)  f)
g)  h)  i)

a)  b)  c)
d)  e)  f)

a)

b)

c)

d)

e)

f)

g)

h)

a)

b)

c)

d)

a)

b)

c)

d)

STRUCTURED OIL-IN-WATER EMULSION AND FOOD PRODUCT COMPRISING THE SAME

This application is a national stage filing under 35 U.S.C. § 371 of International Application No. PCT/SE2020/050411, filed on Apr. 23, 2020, which claims the benefit of the filing date of Swedish Patent Application No. 1930133-2, filed on Apr. 23, 2019, each of which is incorporated herein by reference in its entirety.

The present invention relates to a structured oil-in-water emulsion for use in a food product, a food product, such as a bakery product, comprising the same, and a method of preparing the food product, and the emulsion itself. In addition to oil and water, the structured emulsion of the invention comprises an emulsifier component and a sugar/sugar alcohol component. The particular combination of emulsion components, and their relative amounts, has been found to readily form a structured oil-in-water emulsion which exhibits high stability and low water activity which may obviate the use of saturated fatty acids and trans fatty acids, whilst providing long-shelf life.

Hydrogenation of unsaturated liquid oils has long been relied upon for preparing solid fats which contain a significant proportion of saturated and trans fatty acids as a means for conferring desirable texture and structure to food products, particular those prepared from vegetable oils. As a greater understanding of the negative health impacts of saturated and trans fatty acids has developed, so too have technologies aimed at reducing their prevalence in food products.

EP 2658383 describes the use of an oil component encapsulated by a cross linked protein which is intended to at least partially replace solid fats containing a high proportion of saturated free fatty acids and trans fatty acids in the preparation of a dough for a baked food product.

Other developments include structured emulsions or mesophases containing oil and water phases together with an emulsifier component, which typically exhibit a lamellar-type structure and gel-type consistency, which may be used to confer desirable texture and consistency to food products and at least partially replace saturated and trans fatty acids. However, such structured emulsions can suffer from poor stability, short shelf-life and still require the presence of saturated and trans fatty acids to obtain adequate organoleptic properties.

WO 2014/043778 describes an oil-in-water emulsion for use as a fat substitute which comprises a wax component as a structuring agent and a combination of non-ionic and ionic surfactants.

WO 2005/107489 describes cellular solid matrices comprising structured oil and aqueous phases which are said to provide food products with fat-like consistency without the addition of saturated and trans fatty acids. The cells of the cellular solids are said to trap oil as they are formed, where the cell walls are derived from a multilamellar structure, formed from the self-assembly of an emulsifier component. The cellular solids are said to be of particular use in the manufacture of margarines, spreads and dairy-like products without the use of tropical oils, hydrogenated fats and/or animal fats.

Although the use of such cellular solids offers a means for reducing the reliance on saturated and trans fatty acids whilst at the same time providing desirable texture and fat-like consistency, such compositions have been found not to exhibit high stability or sufficiently long shelf-life that is desirable in most products. The continuous water phase of such mesophases makes the emulsion susceptible to microbial growth. Existing preservation techniques for addressing this susceptibility, for example, through the use of potassium sorbate, are generally incompatible with cellular solids, since such preservation techniques are only efficient at low pH values, which are detrimental to this type of emulsion structure. Furthermore, increasing the salt content, with the aim of lowering water activity to increase microbial shelf-life, only serves to destabilise such structured emulsions, typically leading to unwanted structural changes in the mesophase and loss of water and/or oil from the emulsion and thus spoiling.

There remains a need for improved structured emulsions which can reduce or eliminate the use of saturated and trans fatty acids, achieve desirable texture and consistency in food products whilst also exhibiting high stability and long shelf-life. Furthermore, there remains a particular need for achieving long shelf-life without reliance on artificial ingredients and non-natural additives, in line with the increasing consumer demand for 'clean label' food products.

The present invention relates to a structured oil-in-water emulsion, the particular composition of which has been surprisingly found to provide desirable texture and consistency to food products made using the same, particular when used as a shortening substitute. At the same time, the structured emulsion has been found to exhibit an unprecedented level of stability and a low water activity which means that it has substantially longer shelf life in comparison to other known structured emulsions/mesophases.

In a first aspect, the present invention provides an oil-in-water structured emulsion for use in a food product; said structured emulsion comprising:
  i) from 1 to 8 wt. % emulsifier;
  ii) from 8 to 55 wt. % of sugar and/or sugar alcohol;
  iii) from 12 to 40 wt. % water; and
  iv) from 25 to 70 wt. % oil.

The term 'structured emulsion' used herein is intended to refer to an oil-in-water emulsion that exhibits a mesophase in the form of an ordered lamellar gel network. The architecture of the structured emulsion means that the composition may be considered to be solid or semi-solid. The structured emulsion of the present invention exhibits advantageous stability, meaning that the structured emulsion can exist as a solid or semi-solid over a wide range of temperatures, for example up to temperatures of 100° C., 110° C. and even up to 125° C.

In examples, the structured emulsion of the present invention has: i) a storage modulus, $G'$, which is greater than its loss modulus, $G''$, which parameters are derived from complex shear modulus, $G^*$ (Pa), and phase-shift angle, $\delta$, typically assessed as part of a vector diagram defining visco-elasticity, and ii) tan $\delta = G''/G' < 1$. These parameters may be readily determined by known methods for evaluating time-dependent viscoelastic behaviour (for example using oscillatory tests performed with shearing under constant dynamic-mechanical conditions) or for evaluating temperature-dependent viscoelastic behaviour (for example by exposing the structured emulsion to a frequency sweep, where preferably the storage modulus, $G'$, is constant over the frequency range of from 1 to 5 Hz). The skilled person is aware of rheometer apparatuses that may be used for measuring storage and loss modulus, for instance rheometers from Anton Paar (e.g. MCR300).

The particular combination of components and their relative proportions in the structured emulsion of the invention have been found to be important in providing a structured emulsion which readily forms upon mixing and exhibits a high stability and long shelf-life. The high sugar and/or sugar alcohol content of the emulsion, in combination with the particular proportions of the other ingredients, is believed to be key for providing a structured emulsion with particular structural or morphological features which give rise to heightened stability, which includes unprecedented heat stability.

A high stability alpha gel phase has been found to form in the structured emulsions of the present invention, which has been shown to resist mesomorphic changes over significantly longer time periods, even under elevated temperatures, in comparison to known structured emulsion systems. The inventors have found that the emulsifier component of the structured emulsion retains the characteristic lamellar conformation of the alpha-gel phase up to temperatures which substantially exceed the Krafft temperature. The inventors have also found that the structured emulsion according to the present invention preferentially forms with a smaller oil droplet size in comparison to prior art structured emulsions, as for instance measured using laser diffraction. This may also contribute to, or derive from, the high stability of the structured emulsion according to the present invention.

The structured emulsion of the present invention may be prepared without recourse to preservation techniques commonly relied upon for improving microbial shelf-life, and which do not satisfy 'clean label' requirements. It is known that by reducing the water activity of an edible product, growth of bacteria, moulds and yeasts can be reduced or completely eliminated. The structured emulsion according to the present invention may be readily prepared with sufficiently low water activity to substantially reduce or eliminate bacterial growth. It has been found by the inventors that a low water activity level, typically below 0.90, contributes significantly to long term stability of the structured emulsion against the growth of bacteria, moulds and yeasts, leading to long shelf-life.

As a result of the stability of the structured emulsion, it is possible to reliably prepare food products containing the emulsion which have consistent properties and performance. The structured emulsions of the present invention may, for instance, be relied upon for air uptake and oil binding purposes in food products containing them, in addition to providing texture and consistency commonly associated with saturated and trans fatty acids.

Thus, in another aspect, the present invention provides a dough for preparing a bakery product, the dough comprising: i) a structured emulsion as described herein; ii) flour; and optionally iii) a chemical leavening agent.

Also provided by the present invention is a process for preparing a dough as defined herein, said process comprising the steps of: a) preparing a wet phase comprising the structured emulsion as defined herein; b) preparing a dry phase comprising flour, leavening agent and optionally additional dry ingredients; and c) blending the wet phase and dry phase until a dough is formed.

In yet another aspect, the present invention also provides a cooked or part-cooked food product prepared comprising the structured emulsion as described herein.

Also provided herein is process for preparing a cooked or part-cooked bakery product, said process comprising preparing a dough by the method described herein and cooking the dough to form a cooked or part-cooked bakery product. As defined herein, cooking includes baking, frying and/or microwaving.

The present invention also provides a use of a structured emulsion as defined herein as a shortening substitute.

Emulsifier

The structured emulsion according to the present invention comprises an emulsifier in an amount of from 1 to 8 wt. %. In preferred embodiments, the amount of emulsifier in the structured emulsion of the invention is from 2 to 7 wt. %, more preferably in an amount of from 3 to 5 wt. % or from 4 to 6 wt. %.

The emulsifier utilised in accordance with the present invention is capable of self-assembly to form the structured emulsions of the present invention when combined with the oil and water phases, and sugar/sugar alcohol component, of the emulsion. When forming the oil-in-water emulsions of the present invention, the emulsifier component has been found to preferentially adopt either an alpha or sub-alpha crystalline form, thereby forming an alpha or sub-alpha gel mesophase having the characteristic lamellar structure, which typically includes a hexagonally packed lamellar structure, where water layers are structured between emulsifier bilayers.

Structured emulsions having an alpha gel phase structure which are known in the prior art tend to have only limited stability and will destabilise and/or convert into the thermodynamically favourable beta gel phase ('coagel') over time. This leads to a mesomorphic change in the structured emulsion which can result in oil and/or water loss from the respective phases, detrimentally affecting the texture and consistency of the structured emulsion and of food products comprising it (e.g. as a result of oil/water migration). However, the high stability of the alpha gel phase that forms in the structured emulsions of the present invention have been found to resist mesomorphic changes over much longer time periods.

At low temperature, the sub-alpha gel phase can exist (typically between 7° C. and 13° C.). The sub-alpha gel phase is known to undergo a thermally induced transition to the alpha gel phase at higher temperature, typically above 13° C. The presence of sub-alpha gel phase at low temperature is therefore an indicator of the stable existence of the alpha gel phase at higher temperature. In the present invention, there has been found to be strong retention of the sub-alpha gel phase at low storage temperatures, after 55 days and even longer following formation of the structured emulsion, where substantial reduction in the amount of sub-alpha gel phase is found between 7 and 14 days of storage in known structured emulsions. This therefore indicates that, at higher temperatures, the alpha gel phase of the structured emulsions of the present invention exists over a time period at which destabilisation and mesomorphic changes, such as conversion to the beta gel phase ('coagel'), would have been expected to have occurred in the case of previously known structured emulsions.

The emulsifier component of the present invention may be non-ionic, ionic, or a combination of non-ionic and ionic emulsifiers. In preferred embodiments, the emulsifier component of the present invention comprises a non-ionic emulsifier, preferably in combination with an ionic emulsifier.

Suitable non-ionic emulsifiers for use in the present invention include monoglycerides, propylene glycol fatty acid esters, polyglycerol fatty acid esters and combinations thereof. In preferred embodiments, the non-ionic emulsifier for use in the present invention comprises at least one monoglyceride. In particularly preferred embodiments, the non-ionic emulsifier consists essentially of one or more monoglycerides.

Monoglycerides employed in connection with the present invention may be either 1- or 2-monoglycerides, and may be saturated or unsaturated, preferably saturated. In some embodiments, the monoglycerides include a fatty acid chain length of from 12 to 22 carbon atoms, preferably from 14 to 22 carbon atoms, more preferably from 16 to 20 carbon atoms, for example 16 or 18 carbon atoms. Specific examples of monoglycerides include glycerol monopalmitate and glycerol monostearate. Examples of commercial sources of monoglycerides suitable for use in the present invention include DIMODAN® distilled monoglycerides derived from sunflower, rapeseed, palm and/or soya bean oil, available from DuPont Danisco. Preferably, the monoglycerides do not originate from palm oil.

The propylene glycol fatty acid esters useful in the present invention are mono- and diesters suitably derived from the esterification of propylene glycol with edible fats under alkaline conditions and at elevated temperature. The fatty acid derived moieties of the propylene glycol fatty acid esters may be monounsaturated, polyunsaturated or saturated, or a combination thereof. In preferred embodiments, the fatty acid derived moieties of the propylene glycol fatty acid esters are saturated. In some embodiments, the chain lengths of the fatty acid derived moieties are from 12 to 22 carbon atoms, preferably 14 to 22 carbon atoms, more preferably 16 to 20 carbon atoms, for example 16 or 18 carbon atoms. Particularly preferred propylene glycol fatty acid esters are propylene glycol monoesters of stearic acid, palmitic acid or blends thereof.

The polyglycerol fatty acid esters useful in the present invention may comprise 2 to 10 glycerol repeat monomer units, preferably 2 to 6 glycerol repeat monomer units, more preferably 3 to 5 glycerol repeat monomer units, esterified with one or more saturated or unsaturated fatty acids. In some embodiments, the polyglycerol fatty acid ester is a polyglycerol monoester of a fatty acid.

The fatty acid derived moieties of the polyglycerol fatty acid esters may be monounsaturated, polyunsaturated or saturated, or a combination thereof. In preferred embodiments, the fatty acid derived moieties of the polyglycerol fatty acid esters are saturated. In some embodiments, the chain lengths of the fatty acid derived moieties are from 12 to 22 carbon atoms, preferably 14 to 22 carbon atoms, more preferably 16 to 20 carbon atoms, for example 16 or 18 carbon atoms. Particularly preferred polyglycerol fatty acid esters are polyglycerol monoesters of stearic or palmitic acid having 3 to 5 glycerol repeat monomer units and triglycerol diesters of stearic or palmitic acid.

In particularly preferred embodiments, the non-ionic emulsifier used in the present invention is glycerol monopalmitate, glycerol monostearate, or blends thereof.

Suitable ionic emulsifiers for use in the present invention include acid esters of monoglycerides or diglycerides, fatty acids and metal salts thereof, anionic lactylated fatty acid salts and combinations thereof. In preferred embodiments, the ionic emulsifier for use in the present invention comprises an anionic lactylated fatty acid salt.

Acid esters of mono- and di-glycerides are suitably selected from mono- and di-glycerides esterified with short-chain naturally occurring carboxylic acids, typically derived from plants, such as acetic acid, citric acid, lactic acid, tartaric acid and combinations thereof. An example of an acid ester of diglyceride is glycerol lacto palmitate. Acetylated derivatives of some acid esters of mono- and diglycerides may be used, a particularly preferred examples of which are diacetyl tartaric acid esters of mono and diglycerides (DATEM). Monoglycerides for forming the corresponding acid ester thereof may be as described above. Diglycerides employed in forming the corresponding acid ester thereof may be either 1,2- or 1,3-diglycerides, preferably 1,3-diglycerides, and may be saturated or unsaturated, preferably saturated. In some embodiments, the diglycerides include fatty acid chain lengths each of from 12 to 22 carbon atoms, preferably from 14 to 22 carbon atoms, more preferably from 16 to 20 carbon atoms, for example 16 or 18 carbon atoms.

Fatty acids and metal salts thereof can also suitably act as ionic emulsifiers for use in the present invention. Preferred examples of such fatty acids are saturated and preferably comprising from 14 to 24, more preferably from 16 to 18 carbon atoms in the fatty acid chain. Preferred examples of fatty acids include stearic and palmitic acid, as well as alkali metal salts thereof, preferably sodium salts thereof.

Anionic lactylated fatty acid salts may be used as the ionic emulsifier in the present connection and suitably include those derived from reaction of lactic acid with a fatty acid, preferably as described above, in the presence of sodium carbonate or sodium hydroxide. A particularly preferred example of an anionic lactylated fatty acid salt is sodium stearoyl lactylate (SSL).

In particularly preferred embodiments, the ionic surfactant is selected from stearic acid, sodium stearate, sodium palmitate, palmitic acid, sodium stearoyl lactylate (SSL), and a diacetyl tartaric acid ester of a mono- or diglyceride (DATEM).

Combinations of non-ionic and ionic emulsifiers may be used in the present invention. The combination of a non-ionic and ionic emulsifier may have additional benefits for forming the alpha/sub-alpha gel phase in the structured emulsion of the present invention. A particularly preferred combination of non-ionic and ionic emulsifiers for use in the present invention includes at least one monoglyceride as described herein together with one or more of stearic acid, sodium stearate, sodium stearoyl lactylate (SSL), and diacetyl tartaric acid ester of mono- and diglycerides (DATEM), most preferably at least one monoglyceride as described herein together with sodium stearoyl lactylate (SSL) or sodium stearate.

When employed in combination, it is preferred that the non-ionic emulsifier represents the major proportion of the emulsifier component (i.e. above 50 wt. % of the emulsifier component). In preferred embodiments, the weight ratio of the non-ionic emulsifier to ionic emulsifier is from 70:30 to 99:1, preferably from 75:25 to 95:5, more preferably from 80:20 to 90:10. Thus, in one illustrative example, the combination of non-ionic and ionic emulsifiers may be 80 to 90 wt. % of one or more monoglycerides together with 10 to 20 wt. % sodium stearoyl lactylate (SSL). In another illustrative example, the combination of non-ionic and ionic emulsifiers may be 80 to 95 wt. % of one or more monoglycerides together with 5 to 20 wt. % sodium stearate.

Sugar/Sugar Alcohol

The structured emulsion of the present invention comprises a sugar/sugar alcohol component in an amount of from 8 to 55 wt. %, such as in an amount of from 10 to 40 wt. %, 15 to 35 wt. %, or from 16 to 30 wt. %, or from 18 to 28 wt. %. In other embodiments, the sugar/sugar alcohol component of the structured emulsion is present in an amount of at least 11 wt. %, at least 12 wt. %, at least 13 wt. %, at least 14 wt. %, or at least 15 wt. %. In other embodiments, the sugar/sugar alcohol component of the structured emulsion is present in an amount of less than 30 wt. %, less than 29 wt. %, less than 28 wt. %, less than 27 wt. %, or less than 26 wt. %.

As will be appreciated, the structured emulsion of the present invention comprises significantly higher levels of sugar/sugar alcohol than has hitherto been known in a structured emulsion. The high level of sugar/sugar alcohol, in combination with the particular proportions of the oil and water phases, as well as the emulsifier component, are believed to confer the surprising level of stability the structured emulsion of the invention has been found to exhibit, as well lower the water activity thereby providing a structured emulsion that has a longer microbial shelf life.

The structured emulsion of the present invention has been found to retain a stable sub-alpha gel phase (at low storage temperatures) over substantially longer periods than with conventional structured emulsions comprising lower amounts of sugar/sugar alcohol relative to the other essential components of the structured emulsion. The particular proportions of the emulsifier and the sugar/sugar alcohol used in the structured emulsion of the present invention are believed to provide a structured emulsion with substantially enhanced stability for the sub-alpha and alpha gel phases.

The stability exhibited by the structured emulsion of the present invention includes stability to mesomorphic change (and consequential oil and/or water loss from the structured emulsion) over time, but also unexpectedly stability with respect to heating and also to the presence of salt in the emulsion. For instance, the structured emulsion may, for example, contain up to 1.5 wt. % even up to 2.0 wt. % of sodium chloride, without any negative impact on structural stability. Furthermore, the inventors have found in experiments that the structured emulsion can readily withstand heating at, for example, 30 minutes between 80° C. and 100° C. The improved tolerance of the structured emulsion to the presence of salt may also allow salt to be used as a bacteriostatic and/or a means for lowering water activity yet further, thereby increasing microbial shelf-life even more.

The particular composition of the structured emulsion of the invention is also believed to lead to the formation of the lower than conventional oil droplet sizes observed, as observed for instance by microscope techniques. The inventors believe that the presence of the sugar/sugar alcohol in the particular proportions associated with the structured emulsion of the present invention results in a decreased surface tension of water which leads to a decrease in droplet size. Such droplet size may contribute to, or derive from, the increased stability observed with the structured emulsion of the present invention and may also contribute to the beneficial texture and consistency that the structured emulsion has been found to contribute to food products containing it.

The structured emulsion may comprise sugar and/or a sugar alcohol. In some embodiments, the structured emulsion contains sugar, optionally in combination with a sugar alcohol. Sugar may be utilized in the structured emulsion of the present invention in the absence of sugar alcohol, as part of preparing a 'clean label' food product. Therefore, in some embodiments, the structured emulsion comprises sugar and is free of sugar alcohol. Reference to "free of sugar alcohol" is intended to mean less than 50 ppm of sugar alcohol, preferably less than 10 ppm, more preferably less than 5 ppm of sugar alcohol is present in the structured emulsion.

The term 'sugar' used herein is intended to include a monosaccharide, disaccharide, oligosaccharide having no more than 10 saccharide monomer units and including 5- or 6-carbon saccharides (pentoses and hexoses), or combinations thereof. Suitable monosaccharide for use in the structured emulsion of the invention include glucose, fructose, xylose, ribose, galactose, mannose, arabinose, allulose, tagatose. Suitable disaccharide for use in the structured emulsion of the invention include sucrose, maltose, trehalose, lactose, lactulose, isomaltulose, kojibiose, nigerose, cellobiose, gentiobiose, and sophorose. Suitable oligosaccharides include oligofructose, galacto oligosaccharides, and raffinose.

Preferably, the sugar is selected from sucrose, glucose, galactose, fructose, trehalose, xylose, mannose and combinations thereof. An example combination of sugars for use in the present invention includes invert sugar, corresponding to a mixture of glucose and fructose. Most preferably, the sugar component comprises invert sugar and/or sucrose.

In some embodiments, the structured emulsion of the present invention comprises sugar in an amount of from 8 to 55 wt. %, such as in an amount of from 10 to 40 wt. %, 15 to 35 wt. %, or from 16 to 30 wt. %, or from 18 to 28 wt. %. In other embodiments, the structured emulsion contains sugar in an amount of at least 11 wt. %, at least 12 wt. %, at least 13 wt. %, at least 14 wt. %, or at least 15 wt. %. In other embodiments, the structured emulsion contains sugar in an amount of less than 30 wt. %, less than 29 wt. %, less than 28 wt. %, less than 27 wt. %, or less than 26 wt. %.

The term 'sugar alcohol' used herein is intended to refer to any polyol having at least two carbon atoms which is derived or derivable from the hydrogenation or fermentation of one or more sugars described hereinbefore. Suitable sugar alcohols for use in the present invention include ethylene glycol, glycerol, erythritol, sorbitol, arabitol, xylitol, ribitol, maltitol, mannitol, lactitol, sorbitol and combinations thereof. Preferably, the sugar alcohol is selected from erythritol, sorbitol, arabitol, xylitol, ribitol, maltitol, mannitol, lactitol, sorbitol and combinations thereof. More preferably, the sugar alcohol is selected from erythritol, sorbitol, xylitol, and combinations thereof. Most preferably, the sugar alcohol component comprises maltitol.

In some embodiments, the structured emulsion of the present invention comprises sugar alcohol in an amount of from 8 to 55 wt. %, such as in an amount of from 10 to 40 wt. %, 15 to 35 wt. %, or from 16 to 30 wt. %, or from 18 to 28 wt. %. In other embodiments, the structured emulsion contains sugar alcohol in an amount of at least 11 wt. %, at least 12 wt. %, at least 13 wt. %, at least 14 wt. %, or at least 15 wt. %. In other embodiments, the structured emulsion contains sugar alcohol in an amount of less than 30 wt. %, less than 29 wt. %, less than 28 wt. %, less than 27 wt. %, or less than 26 wt. %.

As will be appreciated by the skilled person, the sugar/sugar alcohol component of the structured emulsion are preferentially soluble/miscible in the aqueous phase of the emulsion, as opposed to the oil phase. Therefore, as discussed in more detail hereinbelow, the sugar/sugar alcohol component may be incorporated into an aqueous phase as the emulsion is prepared.

Aqueous Continuous Phase

The structured emulsion of the present invention comprises from 12 to 40 wt. % water, preferably from 15 to 40 wt. %, more preferably from 15 to 35 wt. % water, most preferably from 15 to 25 wt. % water. As will be appreciated, the continuous aqueous phase of the structured emulsion incorporates all sources of water that have been employed in the preparation of the emulsion. Thus, in addition to water that is added during preparation of the emulsion, any water content of other components of the emulsion will contribute to the aqueous continuous phase and the total water content of the structured emulsion. For example, where the sugar/sugar alcohol component is provided in the form of an aqueous solution before it is combined with the other components of the structured emulsion, the water content of the aqueous solution will make up the total water content of the structured emulsion once prepared. As will also be appreciated, the aqueous phase of the structured emulsion typically comprises additional ingredients that are preferentially water soluble/preferentially water miscible, relative to the oil phase of the structured emulsion.

Reference to 'water' herein is intended to include drinking water, demineralized water or distilled water, unless specifically indicated. Preferably, the water employed in connection with the present invention is demineralised or distilled water. As the skilled person will appreciate, deionized water is also a sub-class of demineralized water.

In preparing the structured emulsion of the present invention, different sources of water may be relied upon in forming the aqueous phase, wherein each water source has a different conductivity, and individually contributes to the conductivity of the aqueous phase as a whole. Preferably, the aqueous phase of the structured emulsion of the present invention has a conductivity of less than 500 μS/cm, preferably less than 100 μS/cm, more preferably less than 10 μS/cm.

The aqueous continuous phase of the structured emulsion of the present invention may be formed substantially of demineralized or distilled water together with the sugar/sugar alcohol component of the emulsion. The polarity of the sugar/sugar alcohol means that this component of the structured emulsion typically preferentially partition into the aqueous phase, as opposed to the oil phase.

Other ingredients that may be included in the aqueous phase include salt, flavourings, colourings and/or stabilizers, although these are by no means essential. As described hereinbefore, the structured emulsion of the present invention has been found to be tolerant of salt. Salt has historically been used as means to lower water activity of food products for extending shelf-life. Nevertheless, it is preferred that the amount of salt that is used is minimised, since salt is not required by the present invention to achieve long microbial shelf life. Preferably, the amount of salt present in the structured emulsion is less than 2.0 wt. %, more preferably less than 1.5 wt. %.

In some embodiments, the structured emulsion includes an aqueous continuous phase which has an alkaline pH. In preferred embodiments, the aqueous phase of the structured emulsion which comprises the water component has a pH of at least 8.0, for example from 8.0 to 10, preferably from 8.0 to 9.5, more preferably from 8.0 to 9.0. For example, the presence of sodium stearate or sodium palmitate in the structured emulsion, both of which are capable of moving between the oil and water phases, have been found to give rise to a pH of from 8.0 to 9.0 in the aqueous phase. It is particularly surprising that the structured emulsion according to the present invention, can include an aqueous phase with alkaline pH, whilst still achieving the long microbial shelf life observed. In conventional systems, employing known preservation techniques it is typical to use acidic pH values optionally in combination with a preserving agent, such as potassium sorbate. The present invention can thus obviate the use of such traditional systems for controlling microbial growth.

The naturally low water activity ($a_w$) of the structured emulsions of the present invention also contributes substantially to the favourable long term stability of the structured emulsion, particularly in terms of long term microbial shelf-life.

The $a_w$ value is calculated by dividing the partial vapour pressure of water in a substance by the standard state partial vapour pressure of water. In the field of food science, the standard state is most often defined as the partial vapour pressure of pure water at the same temperature at which the partial vapour pressure of water in the substance was measured. Using this definition, pure distilled water has a water activity of exactly 1. The $a_w$ value of a substance may be determined by placing a sample in a container which is then sealed and, after equilibrium is reached, determining the relative humidity above the sample. An example of a suitable apparatus for determining $a_w$ is the Aqualab 4TE benchtop water activity meter by Meter group.

The structured emulsions of the present invention may have an $a_w$ of less than 0.90, which is generally considered to be below the threshold at which bacterial growth and reproduction occurs. Therefore, the low water activity exhibited by the structured emulsions of the present invention contributes to the long term stability, particularly against microbial growth, of the structured emulsions. Thus, in some embodiments, the structured emulsion has an $a_w$ of 0.90 or below, preferably an $a_w$ below 0.90. In other embodiments, the structured emulsion retains an $a_w$ of 0.90 or below, preferably an $a_w$ of below 0.90, after storage for 28 days, even after storage for 55 days, at a temperature of less than 30° C.

The structured emulsions of the present invention may nevertheless be formulated with higher and still benefit from other advantages of the invention, as described herein. Thus, in some example, the $a_w$ may be as high as 0.93, 0.92 or 0.91, for instance. Therefore, in some embodiments, the structured emulsion has an $a_w$ of 0.93 or below, 0.92 or below, or 0.91 or below.

The structured emulsions of the present invention may also have a minimum water activity ($a_w$) of 0.6. Thus, the present invention contemplates water activities such as in the range of 0.60 to 0.90 (and likewise 0.60 to 0.93)

Oil Phase

The structured emulsion of the present invention comprises from 25 to 70 wt. % oil, preferably from 35 to 65 wt. % oil, more preferably from 40 to 60 wt. % oil, most preferably 50 to 60 wt. % oil. It will of course be understood that other ranges such as 45 to 55 wt. % and 50 to 55 wt. % are also contemplated.

The oil phase of the structured emulsion may suitably be selected from any edible glyceride oil that is at least partially obtained from a natural source (for example, a plant, animal or fish/crustacean/algae source). The oil may be selected from a vegetable oil, a marine oil, an animal oil and combinations thereof. Preferably, the oil phase exists in a liquid form in the structured emulsion of the invention and therefore glyceride fats, particularly animal fats, that may be solid at room temperature (e.g at 20° C.) may be used in combination with other lower melting point oils to ensure that the oil phase remains liquid. Alternatively, such fats may be fractionated to isolate lower melting point fractions for use in the structured emulsion.

Vegetable oils include all plant, nut and seed oils. Examples of suitable vegetable oils which may be of use in the present invention include: açai oil, almond oil, beech oil, cashew oil, coconut oil, colza oil, corn oil, cottonseed oil, flaxseed oil, grapefruit seed oil, grape seed oil, hazelnut oil, hemp oil, lemon oil, macadamia oil, mustard oil, olive oil, orange oil, peanut oil, palm oil, palm kernel oil, pecan oil, pine nut oil, pistachio oil, poppyseed oil, rapeseed oil (such as high oleic rapeseed oil), rice bran oil, safflower oil (such as high oleic safflower oil), sesame oil, shea butter and its fractions (particularly shea olein), soybean oil (such as high oleic soybean oil), sunflower oil (such as high oleic sunflower oil), walnut oil and wheat germ oil. Preferred, vegetable oils are those selected from corn oil, rapeseed oil (particularly high oleic rapeseed oil), hazelnut oil, sunflower oil (particularly high oleic sunflower oil), safflower oil (particularly high oleic safflower oil), soybean oil (particular high oleic soybean oil), peanut oil, olive oil, flaxseed oil, shea butter and its fractions (particularly shea olein) and rice bran oil.

High oleic vegetable oils are particularly preferred for use in the invention and generally correspond to vegetable oils that contain at least 50 wt. %, preferably at least 60 wt. %, more preferably at least 75 wt. %, most preferably at least 80 wt. % oleic acid esterified on mono-, di- or tri-glycerides. Preferred examples of high oleic vegetable oils include high oleic rapeseed oil, high oleic safflower oil, high oleic soybean oil and high oleic sunflower oil.

Marine oils include oils derived from the tissues of oily fish or crustaceans (e.g. krill) as well as algae. Examples of suitable animal oils/fats include pig fat (lard), duck fat, goose fat, tallow, and butter.

As described hereinbefore, a particular benefit of the present invention is that the use of oils and fats containing significant amounts of saturated and trans fatty acids may be avoided. Thus, in preferred embodiments, the oil phase of the structured emulsion is free of palm oil and/or palm kernel oil.

Oil/Water Ratio

One benefit of the present invention is the relatively low amount of water that may be included in the structured emulsion (i.e. as part of the aqueous phase), whilst achieving the required stability of the oil phase to maintain the structured emulsion. This is particularly advantageous since minimizing the water content can be of assistance in reducing Aw. Providing a structured emulsion with as low a water content as possible is particularly beneficial, and preferred, where the structured emulsion is to be used in a bakery product, as described in more detail hereinafter. In some preferred embodiments, oil/water weight ratio of the structured emulsion is at least 0.6, at least 0.8, at least 1.0, at least 1.4, at least 1.8, or at least 2.2. In other preferred embodiments, the oil/water weight ratio of the structured emulsion is from 0.6 to 5.8, more preferably from 1.0 to 5.0, even more preferably from 2.0 and 4.0, for example 3.0 to 4.0.

Preparation of the Structured Emulsion

As a result of the high stability of the structured emulsion of the present invention, the inventors have found that it is readily prepared by conventional techniques. In particular, the structured emulsion may be prepared, for example, from only a single mixing step. This ease of manufacture may further distinguish the structured emulsion of the present invention from those known in the prior art, which typically require more complicated preparation protocols (for example, a combination of high-speed mixing and static mixing steps).

A suitable method for preparing the structured emulsion of the present invention therefore involves separately preparing the oil and aqueous phases, separately heating the prepared oil and aqueous phases to elevated temperatures, preferably the same elevated temperature, combining and mixing the two phases at elevated temperature, before cooling to room temperature (e.g. 20*C).

Typically, the sugar/sugar alcohol component is dissolved in the aqueous phase and the emulsifier component is dissolved or dispersed in the oil phase. Furthermore, whilst a non-ionic emulsifier may be readily dispersed or dissolved in the oil phase, an ionic emulsifier may preferably be dispersed or dissolved in the aqueous phase. A person of skill in the art may readily identify the phase in which to dissolve or disperse the emulsifier component, as well as other optional additives.

Heating of the separate aqueous and oil phases may be by conventional methods and preferably to an elevated temperature of at least 40° C., more preferably at least 50° C., up to temperatures of preferably less than 90° C., more preferably less than 85° C. In preferred embodiments, the aqueous and oil phases are heated to a temperature of from 65 to 85° C., more preferably from 70 to 80° C., for example 75° C. It is not required that the oil and aqueous phases are heated to the same temperature.

As will be appreciated, the emulsifier component should be provided at a temperature which is above the Krafft temperature, as well as above the melting temperature of the emulsifier component, but below the lamellar to non-lamellar transition temperature of the emulsifier. For this reason, the oil-phase comprising the emulsifier component is preferably heated to greater than 65° C. and less than 90° C. In preferred embodiments, immediately after combining of the oil and aqueous phases, the Krafft temperature remains exceeded.

As the structured emulsion is an oil-in-water emulsion, the heated oil phase is typically added to the heated aqueous phase with stirring, for example for 5 to 60 minutes depending on the scale of the preparation. Preferably, addition of the oil phase is incremental, with simultaneous mixing of the combined phases using any conventional mixing apparatus. On a small scale, this may be achieved using a hand mixer (for example the Dynamic MD95 hand mixer). On an industrial scale, standard emulsifying equipment may be used (examples of which include the SPX Emulsifying System, type ERS, and IKA Standard Production Plant). The shear rate of mixing is not believed to be particularly influential to the formation of the structured emulsion of the invention. Nevertheless, inline high shear mixers (IKA Ultra Turrax), homogenisers (SPX APV) or ultrasonic emulsification (Hielscher) may be used in preparation of the structured emulsion.

Following complete addition of the oil phase to the aqueous phase, the mixture is allowed to cool to room temperature (e.g. 20° C.). Although the application of refrigeration or external cooling is not a requirement, increasing the rate of cooling can be advantages in preserving the properties of the structured emulsion and delaying loss of the alpha gel phase after formation.

Thus, in some preferred embodiments, refrigeration or external cooling is applied following formation of the structured emulsion at elevated temperature. Rates of cooling achievable with refrigeration or external cooling may be, for instance, higher than 10° C. per minute, preferably higher than 50° C. per minute. Preferably, where refrigeration or external cooling is applied, this is done to reduce the temperature of the structured emulsion after formation to 50° C. or below, preferably 40° C. or below, more preferably 35° C. or below, depending on the temperature at which the structured emulsion is formed. Refrigeration or external cooling may be applied until the prevailing environmental temperature condition is achieved. Alternatively, the application of refrigeration or external cooling may be stopped and further cooling may arise as a result of the prevailing environmental temperature condition (with a correspondingly slower cooling rate). Refrigeration or external cooling may be achieved using conventional equipment, for example plate heat exchangers, tube coolers, or scraped surface heat exchangers.

However, it has surprisingly been found that particularly good results can be obtained when a tubular cooling device is used. Such devices are known in the art, and may be operated in accordance with the preferred cooling conditions above. The present inventors have unexpectedly found that when such a device is used to provide cooling to the present process, the results are of a superior nature due to the product formed possessing smaller emulsion droplet sizes. This has the added benefit of potentially still further extending the shelf-life of products formed using the resulting structured emulsion. Without wishing to be bound by any particular theory, it is believed that the lower shear forces of the tubular cooler in comparison with other known devices, such as scraped surface heat exchangers, helps to provide such beneficial results.

Where a tubular cooling device is used, suitable cooling temperatures include 0 to 35° C., such as 5 to 30° C., and more specifically 10 to 25° C.

As discussed hereinbefore, it has been found that the structured emulsion formed in accordance with the present invention may be further distinguished from known structured emulsions by virtue of a surprisingly small emulsion droplet size. For example, the structured emulsion according to the present invention may be prepared with oil droplets having a unimodal size distribution and/or an equivalent surface area mean diameter (the so called "Sauter mean diameter" or "D(3.2)") of from 0.1 to 10 μm. Nevertheless, the structured emulsion according to the present invention has been found to form smaller than conventional oil droplets. Thus, in preferred embodiments, the oil droplets have a surface area mean diameter of less than 5 μm, for example from 0.1 to 5 μm, from 0.1 to 4 μm, from 0.1 to 3 μm, from 0.1 to 2 μm, or from 0.1 to 1.5 μm, as may be determined by Dynamic Light Scattering (DLS), microscope techniques (for example, Scanning Electron Microscope (SEM) techniques) or laser diffraction techniques. A suitable apparatus for performing laser diffraction includes the Malvern Mastersizer X by Malvern Instruments.

The oil droplet size associated with the structured emulsion of the present invention is believed to contribute to, or derive from, the increased stability exhibited by the structured emulsion of the invention. For instance, where there is a lack of emulsion stability, smaller oil droplets would be expected to undergo coalescence, such that the amount of emulsifier is at least adequate to provide an individual droplet with sufficient stability. It is therefore possible that the sugar/sugar alcohol component, in the proportions utilized in accordance with the present invention, results in particular structural properties in the emulsion which lead to enhanced stability which means that smaller droplet sizes are achievable and resistant to coalescence. In particular, the inventors believe that the presence of the sugar/sugar alcohol in the particular proportions associated with the structured emulsion of the present invention results in a decreased surface tension of water which leads to a decrease in droplet size, for the same energy input. The low oil droplet size which may be exhibited by the structured emulsion of the present invention is believed to also be particularly beneficial for providing advantageous texture and consistency to food products comprising it.

Food Products

The structured emulsion according to the present invention has been found to provide desirable structure, texture and/or consistency to a variety of different food products. In particular, the structured emulsion of the present invention finds particular application as a shortening substitute in bakery products.

Thus, in another aspect, the present invention provides a cooked or part-cooked food product prepared using the structured emulsion described herein, preferably a bakery product.

In a further aspect, the present invention provides a dough for preparing a bakery product, comprising a structured emulsion as described herein, flour and optionally sugar. The dough may further comprise a leavening agent. Optional additional ingredients may include one or more of eggs, water, liquid emulsifier, liquid sugar and syrups, milk, liquid flavours, alcohols, humectants, honey, liquid preservatives, liquid sweeteners, liquid oxidising agents, liquid reducing agents, liquid anti-oxidants, liquid acidity regulators, liquid enzymes, milk powder, yeast, sugar substitutes, protein, powdered emulsifiers, starch, salt, spices, flavour components, colourants, cocoa, thickening and gelling agents, egg powder, enzymes, gluten, preservatives, sweeteners, oxidising agents, reducing agents, anti-oxidants, and acidity regulators. As will be appreciated, where sugar is used as an additional ingredient in a dough, or a bakery product prepared therefrom, this is distinct from any sugar of the sugar/sugar alcohol component of the structured emulsion.

Examples of suitable bakery products include biscuits, cookies, crackers, hardtack, pretzels, cut bread, wafers, sable, Langue du chat, macaroons, butter cakes (such as pound cake, fruit cake, Madeleine, Baumkuchen, castella), sponge cakes (such as short cake, roll cake, torte, decorated cake, chiffon cake), cream puffed confectionery, fermentation pastry, western style fresh confectionery such as pie and waffle, tarts, sweet buns, French bread, tortilla, stollen, panettone, brioche, donuts, Danish pastry and croissants. Preferably, the edible food product is a cookie or a biscuit.

In the preparation of a dough for a bakery product, the structured emulsion of the present invention may be used as the 'creaming phase' to be admixed with the dry ingredients of the dough, the main component of which being flour. Doughs prepared using the structured emulsion according to the present invention have been found to exhibit significantly less 'oiling out', compared with a dough comprising a known structured emulsion or oils and fats low in saturated and trans fatty acids. As discussed hereinbefore, 'oiling out' is typically indicative of emulsion instability and mesomorphic changes in the structure of the emulsion itself.

The apparent reduction of 'oiling out' in the case of doughs prepared with the structured emulsion of the present invention also has follow on benefits as regards the preparation of bakery products therefrom. For example, baked cookies prepared from the dough of the invention were found to have a more regular surface topography and fewer cracks compared with baked cookies prepared under the same conditions using a dough comprising a known structured emulsion. It is thus apparent that the benefits of the structured emulsion of the present invention extends to food products, particularly bakery products, comprising the same.

Even still further, it has been surprisingly found that when used in the preparation of bakery products, the resultant baked goods, such as cookies, are not as susceptible to fat blooming when compared to the use of known compositions. It will be appreciated that this improves the stability of the products formed and their suitability for storage, without known issues such as colour stability. Thus, a further aspect of the present invention is the use of the present structured emulsions for reducing fat blooming in bakery products.

In a further aspect, the present invention relates to a process of preparing a dough as described herein, said process comprising the steps of a) preparing a wet phase comprising the structured emulsion as defined herein; b) preparing a dry phase comprising flour and optionally leavening agent and additional optional dry ingredients; and c) blending the wet phase and dry phase until a dough is formed. Optional additional dry ingredients according to this aspect of the invention include sugar, salt, flavourings and colourings.

As will be appreciated by the skilled person, the order in which the wet phase and the dry phase is prepared is not limited. The wet phase according to this aspect of the invention may consist essentially of the structured emulsion or may comprise the structured emulsion with other ingredients of the dough. As described herein, the structured emulsion includes a sugar/sugar alcohol component as well as optionally salt and other ingredients. Nevertheless, in some embodiments, additional sugar may be incorporated into the wet phase for flavouring of the dough, as well as, or instead of, the dry phase. Other optional additional dry ingredients may be partially or fully incorporated into the wet phase, in addition to or instead of the dry phase, prior to blending of the wet phase with the flour-containing dry phase.

A leavening agent as referred to herein is intended to refer to a substance, or combination of substances, which releases gas bubbles (usually carbon dioxide), which may then expand upon heating (cooking) to give an aerated texture to a food product. Leavening agents may include biological or preferably chemical agents, for example chemical leavening agents may comprise a combination of an alkaline and an acidic component which combine to produce carbon dioxide gas. Examples of alkaline components include sodium bicarbonate, sodium carbonate, ammonium bicarbonate, ammonium carbonate, potassium bicarbonate, potassium carbonate, and potassium bitartrate. Examples of acidic components include monocalcium phosphate, dicalcium phosphate, monosodium phosphate, sodium aluminium phosphate, and sodium acid pyrophosphate. Preferably, the leavening agent is selected from sodium bicarbonate, sodium acid pyrophosphate and monocalcium phosphate, most preferably the leavening agent is sodium bicarbonate.

In yet a further aspect, the present invention also provides a process for preparing a baked or part-baked bakery product, said process comprising preparing a dough by the process described hereinbefore and further comprising cooking the dough (such as by baking, frying and/or microwaving) to form a cooked or part-cooked bakery product.

In still a further aspect of the present invention, the present invention also provides a use of a structured emulsion as described herein as a shortening substitute.

The present invention will now be described by way of reference to the Figures and Examples, in which.

GENERAL METHOD FOR PREPARING THE STRUCTURED EMULSIONS

Figure 1A:
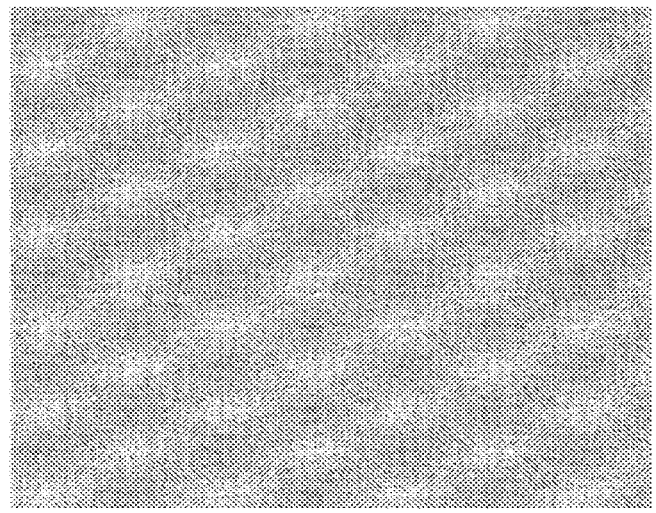
FIGS. 1a and 1b are optical microscope images of a structured emulsion according to the invention (FIG. 1a) and not in accordance with the invention (FIG. 1b)

An oil phase was prepared by combining oil with the emulsifier component and an aqueous phase was prepared by combining de-ionized water with a sugar component (if present). Oil and aqueous phases were both separately heated to 75° C. The oil phase was slowly added to the aqueous phase over the course of two minutes with simultaneous mixing using a Dynamic MD95 hand mixer to give a batch of 2 kg combined weight. The mixture was then allowed to cool naturally to room temperature (20° C.).

Example 1

A first structured emulsion (Emulsion A) in accordance with the present invention was prepared using the above general method. The composition of the structured emulsion is as follows:

48.75 wt. % rapeseed oil
3.75 wt. % emulsifier (distilled monoglyceride, Dimodan HR 85 S6, comprising 6% by weight of the emulsifier of sodium stearate)
22.5 wt. % de-ionized water
25 wt. % refined sucrose (EC category 1)
Oil to water weight ratio: 2.17

The water activity of Emulsion A was determined to be 0.88 using an Aqualab 4TE benchtop water activity meter. The pH of the aqueous continuous phase of the emulsion was also measured and found to be 8.6 using a pH probe (Sartorius PB-11) inserted directly into the emulsion.

A second structured emulsion (Emulsion B) not in accordance with the present invention was prepared using the above general method. The composition of the structured emulsion is as follows:

65 wt. % rapeseed oil
5 wt. % emulsifier (4 wt. % glycerylmonostearate (Myverol 18-08 NP) and 1 wt. % SSL)
30 wt. % de-ionized water
Oil to water weight ratio: 2.17

The water activity of the Emulsion B was determined to be from 0.99 using an Aqualab 4TE benchtop water activity meter. The pH of the aqueous continuous phase of the emulsion was also measured and found to be 5.45 using a pH probe (Sartorius PB-11) inserted directly into the emulsion.

Microbial evaluations of the Emulsions A and B were made following preparation and over a 28-day storage period at different temperatures and following exposure to air ("open lid"). Results of the analyses for Emulsions A and B are provided in Tables 1 and 2 below respectively.

TABLE 1

| Days | Condition | Yeast* (CFU/g) | Aerobe** colony count 37° C. (CFU/g) | Moulds*** (CFU/g) |
|---|---|---|---|---|
| 0 | 20° C. | <10 | <10 | <10 |
| 0 | 37° C. | <10 | <10 | <10 |
| 0 | 20° C., open lid | <10 | <10 | <10 |
| 14 | 20° C. | <10 | <10 | <10 |
| 14 | 37° C. | <10 | 20 | <10 |
| 14 | 20° C., open lid | <10 | <10 | <10 |
| 21 | 20° C. | <10 | <10 | <10 |
| 21 | 37° C. | <10 | <10 | <10 |
| 21 | 20° C., open lid | <10 | <10 | <10 |
| 28 | 20° C. | <10 | <10 | <10 |
| 28 | 37° C. | <10 | <10 | <10 |
| 28 | 20° C., open lid | <10 | <10 | <10 |

*AFNOR 3M 01/13-07/14
**AFNOR 3M 01-1-09/89
***3M Nordval n16

TABLE 2

| Days | Condition | Yeast* (CFU/g) | Aerobe** colony count 37° C. (CFU/g) | Moulds*** (CFU/g) |
|---|---|---|---|---|
| 0 | 20° C. | <10 | 20 | <10 |
| 0 | 37° C. | <10 | 40 | <10 |
| 0 | 20° C., open lid | <10 | 10 | <10 |
| 14 | 20° C. | <10 | 10 | 92000 |
| 14 | 37° C. | 6800 | 410 | 43000 |
| 14 | 20° C., open lid | <10 | 10 | 64000 |
| 21 | 20° C. | <10 | <10 | 18000 |
| 21 | 37° C. | 660 | 40 | 23000 |
| 21 | 20° C., open lid | 4900 | 10 | 4300 |
| 28 | 20° C. | 2000 | 680 | >15000 |
| 28 | 37° C. | >15000 | 20 | >15000 |
| 28 | 20° C., open lid | >15000 | 10 | >15000 |

*AFNOR 3M 01/13-07/14
**AFNOR 3M 01-1-09/89
***3M Nordval n16

The results in Tables 1 and 2 above demonstrate that Emulsion A (invention) has far superior resistance to microbial, yeast and mould reproduction and growth over the storage period analysed in comparison to Emulsion B (comparative). There is little evidence of microbial, yeast and mould reproduction and growth over the course of the experiment in the case of Emulsion A according to the invention. This is believed to be the result of the lower water activity of the aqueous phase of Emulsion A, in comparison to comparative Emulsion B. Comparative Emulsion B has a water activity which is sufficiently high to support bacterial, mould and yeast growth and also has an aqueous phase with an acidic pH. The lower water activity associated with Emulsion A is believed to derive from the particular proportions of emulsion components, particularly the high sugar content which is substantially higher than in known structured emulsions, and also the resulting impact on the pH of the aqueous continuous phase. Such a high resistance to microbial, yeast and mould reproduction is particularly surprising for an emulsion with a continuous phase having alkaline pH, since such benefits are typically observed where acidic pH is employed together with a preservative system. Emulsion A illustrates how the present invention can obviate conventional means for extending microbial shelf-life of structured emulsions.

Figure 1B:
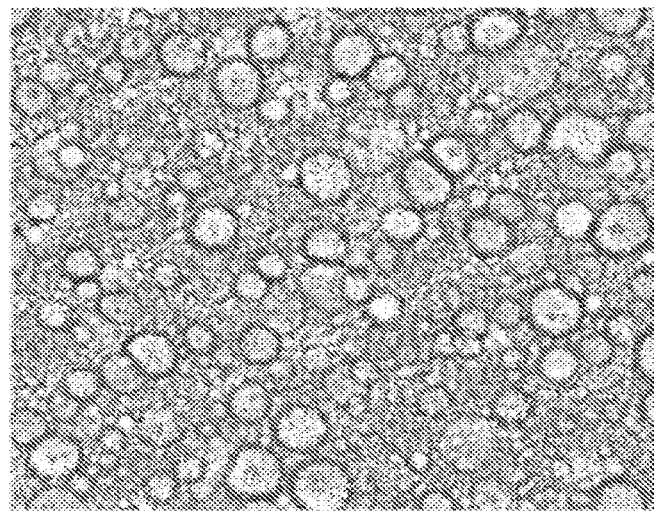

Emulsions A and B were also analysed by optical microscope and microscope images of Emulsion A and B are provided in FIGS. 1a and 1b respectively. As can be clearly seen, the microscope images show that Emulsion A of the invention has significantly smaller oil droplet size in comparison to Emulsion B, despite being prepared by the same general method.

Example 2

Further structured emulsions were prepared by the above general method. Emulsion C (comparative) includes the same oil phase and emulsifier components but does not include the high proportion of sugar according to the present invention (the amount of sugar in Emulsion C is instead only 5 wt. %). Emulsions D to F are in accordance with the present invention and comprise from 10 wt. % to 25 wt. % of sugar. Further details of the compositions of the Emulsions C to F are provided below in Table 3. P47619

TABLE 3

| Emulsion Component | Component Phase | Emulsion C | D | E | F |
|---|---|---|---|---|---|
| Oil | oil phase | 57 | 55 | 48.75 | 48.75 |
| distilled monoglyceride, Dimodan HR 85 S6 | oil phase | 5 | 5 | 3.75 | 3.75 |
| De-ionized water | aqueous phase | 33 | 30 | 22.5 | 22.5 |
| Sugar | aqueous phase | 5 | 10 | 25 | 25 |
| lemon juice | aqueous phase | — | — | — | yes |
| pH aqueous phase (pre-emulsion) | | — | — | 6.43 | 3.84 |

TABLE 3-continued

| Emulsion Component | Component Phase | Emulsion C | D | E | F |
|---|---|---|---|---|---|
| pH aqueous phase (post-emulsion) | | 8.56 | 8.83 | 9 | 8.15 |
| Water Activity Aw | | 0.9811 | 0.9706 | 0.89 | 0.89 |

As may be seen below, Emulsion F also contains a pH modifier (lemon juice) in the aqueous phase and shows that, although prior to emulsification the aqueous phase is acidic, emulsification still provides an aqueous continuous phase which is alkaline. This shows that the nature of the structured emulsion and the interaction of the aqueous phase with at least the emulsifier and/or sugar/sugar alcohol component induces a change to alkaline pH.

Emulsions C to F were analyzed by Differential Scanning calorimetry (DSC) over the course of a 55 day storage period at 20° C. in a sealed container. DSC was used to identify the presence of a melting peak at 7-13° C., which is characteristic of the sub-alpha gel phase and results are plotted in the graph of FIG. 2.

Figure 2:
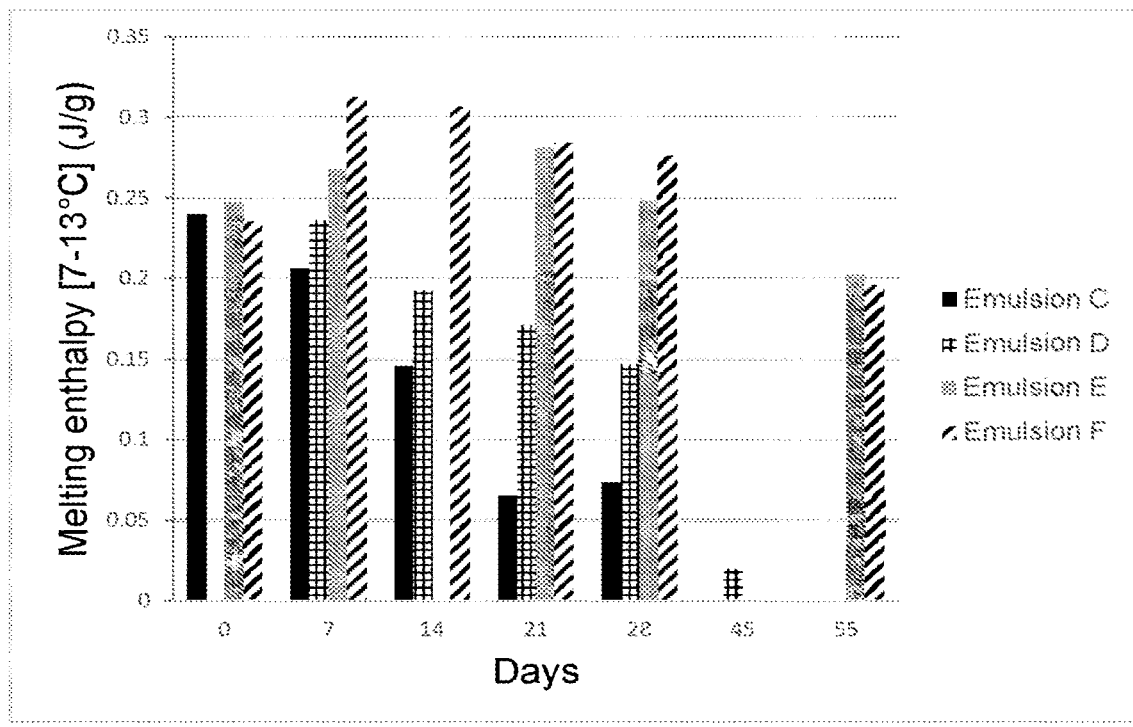
FIG. 2 is a graph showing of the change in the concentration of sub-alpha gel phase in inventive and comparative structured emulsions based on melting enthalpy (7-13° C.) stored for up to 55 days.

The results in FIG. 2 show that there is a substantial loss of the sub-alpha phase peak associated with comparative Emulsion C over a 28 day period. There is however a significantly higher retention of the sub-alpha phase peak for inventive Emulsion D, which contains twice the amount of sugar in the emulsion compared to Emulsion C. Emulsions E and F, which contain yet higher sugar concentrations, indicate near complete retention of the alpha-phase over the same 28 day period, and a significant majority of the alpha-phase retained after even 55 days.

This example demonstrates how the proportion of the ingredients of the structured emulsion of the invention, particularly the high proportion of sugar, has been found to provide a structured emulsion which exhibits surprising stability for the sub-alpha and alpha gel phases, and therefore resistance to mesomorphic change to the beta gel phase and any unwanted oil and/or water loss.

Figure 3A:
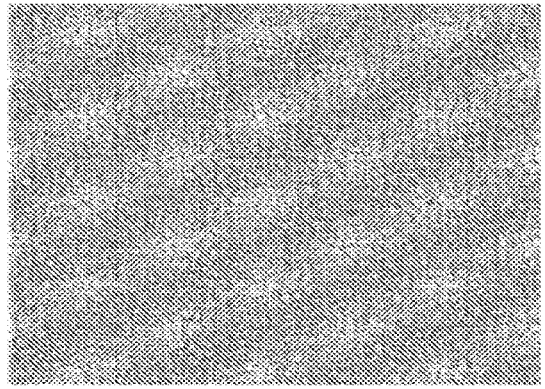
FIGS. 3a and 3b are optical microscope images of a structured emulsion not according to the invention (FIG. 3a) and in accordance with the invention (FIG. 3b), where each structured emulsion comprises a different proportion of a sugar component.
Figure 3B:
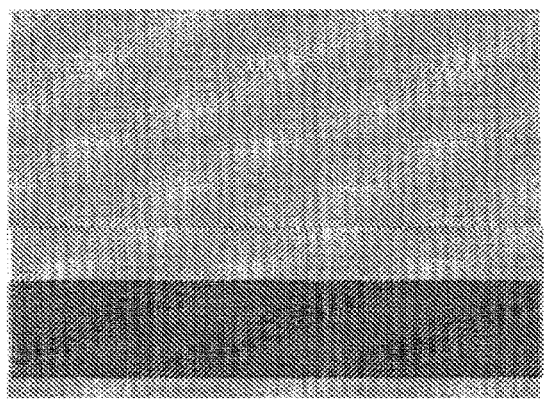

Emulsions C and E were also analysed by optical microscope and microscope images of Emulsion C and E are provided in FIGS. 3a and 3b respectively. As can be clearly seen, the microscope images show that Emulsion E of the invention has significantly smaller oil droplet size in comparison to Emulsion C, despite being prepared by the same general method. This is considered to be a further illustration of how the particular proportion of ingredients of the emulsion of the invention gives rise to a material difference in the nature and stability of the resulting structured emulsion.

Example 3

A first structured emulsion (Emulsion G) in accordance with the present invention was prepared using the above general method. The composition of the structured emulsion is as follows:
   55 wt. % rapeseed oil
   5 wt. % emulsifier (distilled monoglyceride, Dimodan HR 85 S6, comprising 6% by weight of the emulsifier of sodium stearate)
   30 wt. % de-ionized water
   10 wt. % refined sucrose (EC category 1)
   Oil to water weight ratio: 1.83

The water activity of Emulsion G was determined to be from 0.97 using an Aqualab 4TE benchtop water activity meter.

A second structured emulsion (Emulsion H) not in accordance with the present invention was prepared using the above general method. The composition of the structured emulsion is as follows:
   65 wt. % rapeseed oil
   5 wt. % emulsifier (distilled monoglyceride, Dimodan HR 85 S6, comprising 6% by weight of the emulsifier of sodium stearate)
   30 wt. % de-ionized water
   Oil to water weight ratio: 2.17

The water activity of the Emulsion H was determined to be from 0.99 using an Aqualab 4TE benchtop water activity meter.

Emulsions G and H were stored for 6 weeks at 20° C. in a sealed container. Afterwards, cookie doughs were prepared using the emulsions using the recipe provided in Table 4 below.

TABLE 4

| | | Weight (g) | |
|---|---|---|---|
| | | Invention | Comparative |
| Creaming phase | Emulsion G | 300 | |
| | Emulsion H | | 275 |
| | Sugar | 45 | 70 |
| Dough up phase | Flour | 385 | 385 |
| | Sugar | 80 | 80 |
| | Baking powder | 6.2 | 6.2 |
| | Skimmed milk powder | 6.6 | 6.6 |
| | Salt | 4.6 | 4.6 |

The creaming phase was prepared in each case by combining sugar (refined, EC category 1) and the emulsion and mixing in a Hobart Mixer apparatus with a flat beater for 1 minute at Speed 1 followed by 1 minute at Speed 2.

The dough up phase of dry ingredients were in each case blended and sieved before being added to the corresponding prepared creaming phase. The resulting mixture was then mixed with the Hobart Mixer for 1 minute at Speed 1 to form a dough.

Each prepared dough was evaluated for oil loss by forming sheets of the doughs of 2 cm thickness using a Fritsch lamination table. Round dough pieces were cut from each sheet (height 2 cm, diameter 5 cm, weight 40-42 g) and each dough piece was applied to a Whatmann #4 110 mm filter paper for 1 hour, before being removed. After, resting for a further hour, measurement of the weight of the Whatman paper was conducted to determine the amount of oil adsorption from the dough pieces. The dough quality was also assessed. The results of the oil loss experiment and the dough assessment are shown in Table 5 below.

TABLE 5

| | Difference in weight filter paper = oil adsorbed (g) | Dough quality score (1 = low; 5 = best) |
|---|---|---|
| Invention (Emulsion G) | 0.004 | 4 |
| Comparative (Emulsion H) | 0.018 | 2.5 |

As can be seen from the results in Table 5, the dough prepared using Emulsion G in accordance with the present invention produced substantially lower amounts of oil loss than for the comparative dough prepared using Emulsion H. This is believed to be at least partially derived from the stability of Emulsion G to mesomorphic changes over the 28-day storage period. The lower oil droplet size of Emulsion G compared to Emulsion H is also believed to contribute to the improved performance. In contrast, Emulsion G clearly suffers from some oil loss over the storage period, which is believed to be at least partially the result of a mesomorphic change in the emulsion structure. This mesomorphic change also negatively impacts the quality of the dough which is prepared from the emulsion, with the dough prepared using the inventive Emulsion G scoring far higher in the quality assessment (4 vs 2.5).

Figure 4A:
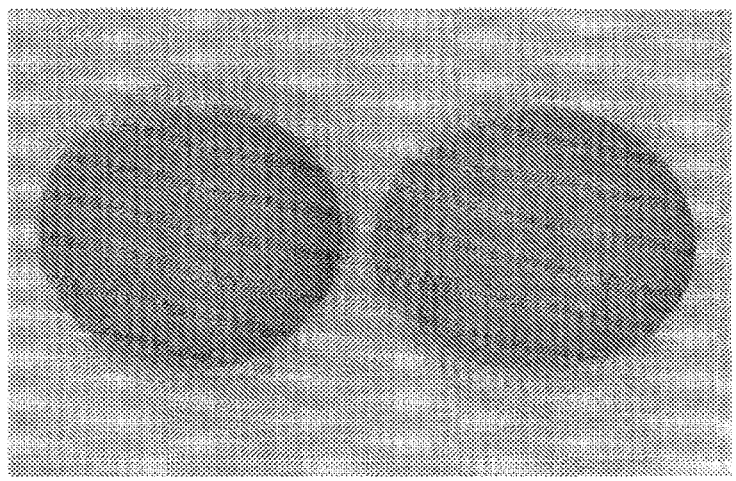
FIGS. 4a and 4b show images of cookies prepared using doughs comprising a structured emulsion according to the invention (FIG. 4a) and not in accordance with the invention (FIG. 4b)
Figure 4B:
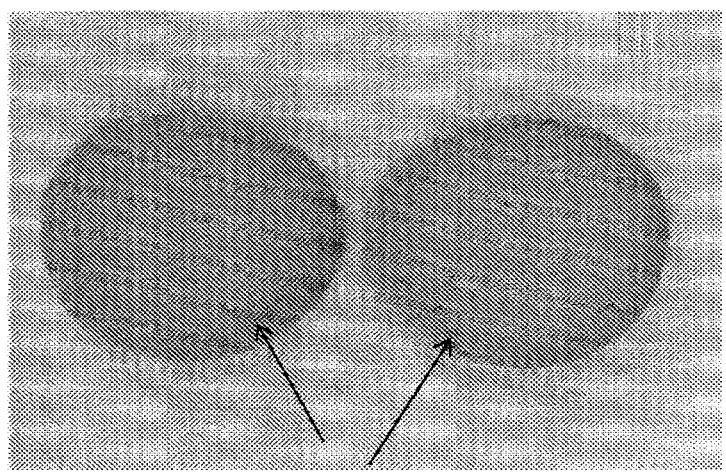
Figure 5:
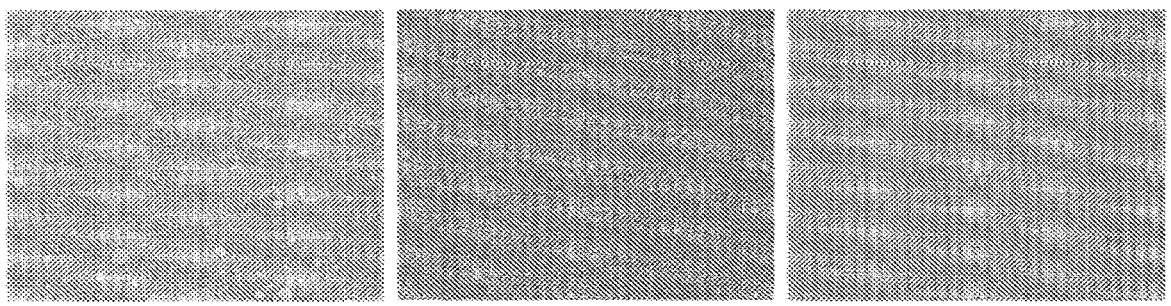
FIGS. 5a to 5i show optical microscope images (×10 objective lens) of different samples of structured emulsion at different stages in a heat treatment experiment.
Figure 5:
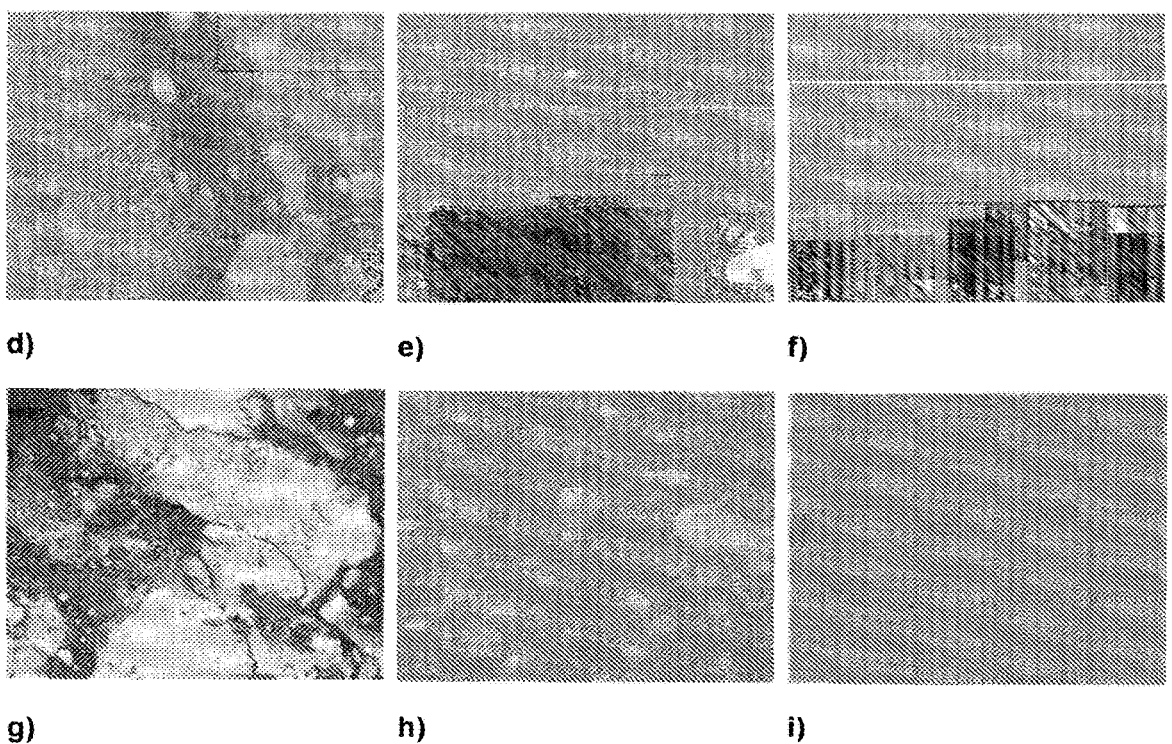
Figure 6:
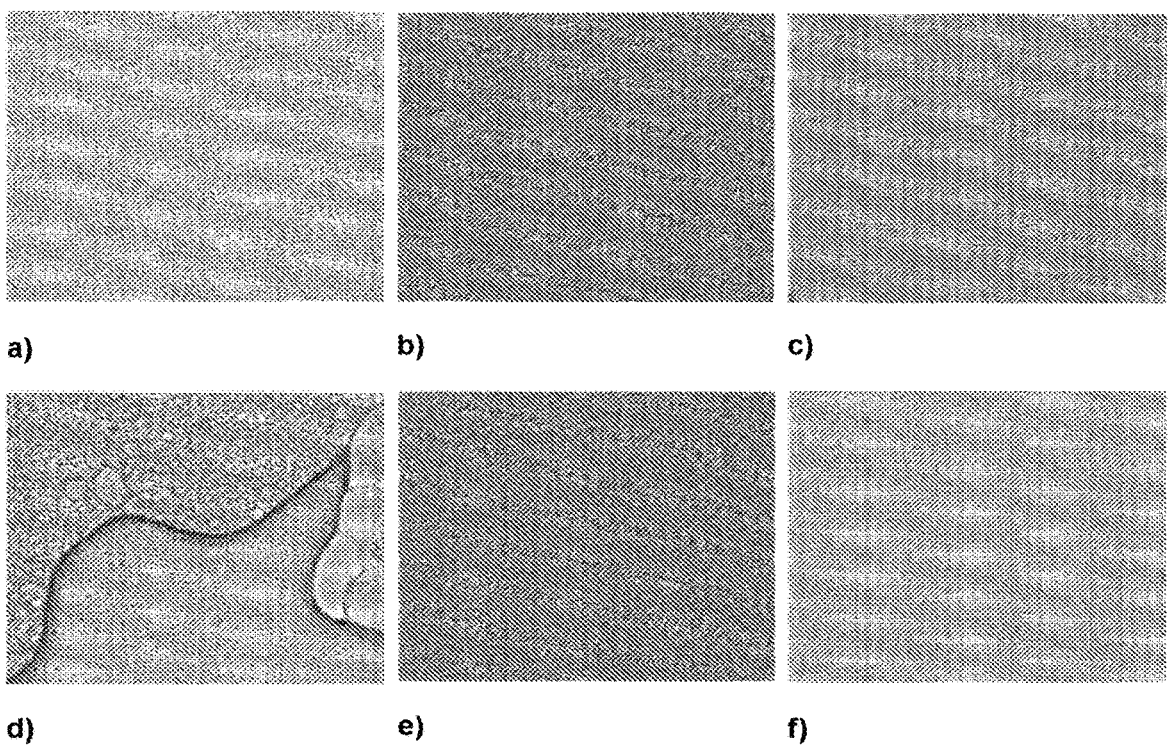
FIGS. 6a to 6i show optical microscope images (×40 objective lens) of different samples at different stages in a heat treatment experiment.
Figure 6:
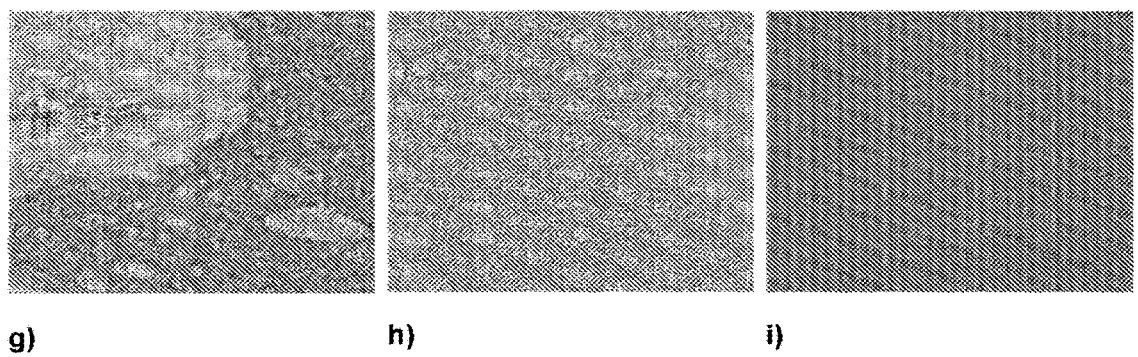

The dough was rolled out until a height/thickness of 5 mm. Round dough pieces were cut (diameter 5 cm) and baked for 20 minutes in a deck oven at 180° C. (top)/160° C. (bottom). Cookies prepared from the inventive doughs also show improved properties compared to those prepared from the comparative doughs under the same conditions. FIG. 4a shows a picture of the inventive cookie, whilst FIG. 4b shows a picture of the comparative cookie. As can be seen, there is significant cracking at the surface of the cookie prepared from the comparative dough (indicated by the arrows).

This example further illustrates the advantages of the structured emulsion of the invention, particularly the long term stability and the benefits thereof in the preparation of a food product.

Example 4

A comparative structured emulsion (Emulsion I) was prepared using the above general method. The composition of the structured emulsion is as follows:
60 wt. % sunflower oil (approximately 80% oleic acid)
35 wt. % de-ionized water
5 wt. % emulsifier (distilled monoglyceride, Dimodan HR 85 S6, comprising 6% by weight of the emulsifier of sodium stearate)
Oil to water weight ratio: 1.71

A structured emulsion according to the present invention (Emulsion J) was prepared using the above general method. The composition of the structured emulsion is as follows:
58 wt. % sunflower oil (approximately 80% oleic acid)
27.5 wt. % demineralised water
4.5 wt. % emulsifier (distilled monoglyceride, Dimodan HR 85 S6, comprising 6% by weight of the emulsifier of sodium stearate)
10 wt. % refined sucrose (EC category 1)
Oil to water weight ratio: 2.11

A further structured emulsion according to the present invention (Emulsion K) was prepared using the above general method. The composition of the structured emulsion is as follows:
50 wt. % sunflower oil (approximately 80% oleic acid)
21.8 wt. % demineralised water
4.2 wt. % emulsifier (distilled monoglyceride, Dimodan HR 85 S6, comprising 6% by weight of the emulsifier of sodium stearate)
24 wt. % refined sucrose (EC category 1)
Oil to water weight ratio: 2.29

300 g each of Emulsions I to K were subjected to ambient storage or heat treatment under the following conditions: i) stored at room temperature (20° C.), ii) subjected to 1 hour in a deck oven at 140° C.; and iii) subjected to 1 hour in a deck oven at 180° C. During treatment, the temperature of the emulsions was recorded using a temperature probe.

The treated samples were subsequently analysed using a Zeiss Axiostar plus microscope (ocular magnifications of ×10 and ×40). FIGS. 5a to 5i (×10 ocular magnification) and FIGS. 6a to 6i (×40 ocular magnification) show optical microscope images of the different samples at different stages in the above treatment, in particular: 5a: Emulsion I; 5b: Emulsion J; 5c: Emulsion K; 5d: Emulsion I after 1 hour in deck oven at 140° C.; 5e: Emulsion J after 1 hour in deck oven at 140° C.; 5f: Emulsion K after 1 hour in deck oven at 140° C.; 5g: Emulsion I after 1 hour in deck oven at 180° C.; 5h: Emulsion J after 1 hour in deck oven at 180° C.; 5i: Emulsion K after 1 hour in deck oven at 180° C.; 6a: Emulsion I; 6b: Emulsion J; 6c: Emulsion K; 6d: Emulsion I after 1 hour in deck oven at 140° C.; 6e: Emulsion J after 1 hour in deck oven at 140° C.; 6f: Emulsion K after 1 hour in deck oven at 140° C.; 6g: Emulsion I after 1 hour in deck oven at 180° C.; 6h: Emulsion J after 1 hour in deck oven at 180° C.; and 6i: Emulsion K after 1 hour in deck oven at 180° C.

As can be seen from FIGS. 5a to 5i and FIGS. 6a to 6i, as sugar concentration increases over the range test in the structured Emulsions Ito K, the smaller the oil droplets become, as observed by microscope analysis. Emulsion breakdown is observed at elevated temperatures in comparative Emulsion I (particularly evident in FIGS. 5d, 5g, 6d and 6g). However, the addition of sugar, specifically over the high range in accordance with the present invention, significantly improves the emulsion stability at higher temperatures and no emulsion breakdown was observed.

Example 5

A structured emulsion according to the present invention (Emulsion L) was prepared using the above general method. The composition of the structured emulsion is as follows:
48.75% rapeseed oil
3.525% glycerol monostearate
0.225% sodium stearate
22.5% de-ionised water
25% refined sucrose (EC category 1)
Oil to water weight ratio: 2.17

A comparative structured emulsion (Emulsion M) was prepared using the above general method. The composition of the structured emulsion is as follows:
60.175% rapeseed oil
4.5% glycerol monostearate
0.225% sodium stearate
35.1% de-ionised water
Oil to water weight ratio: 1.71

Figure 7:
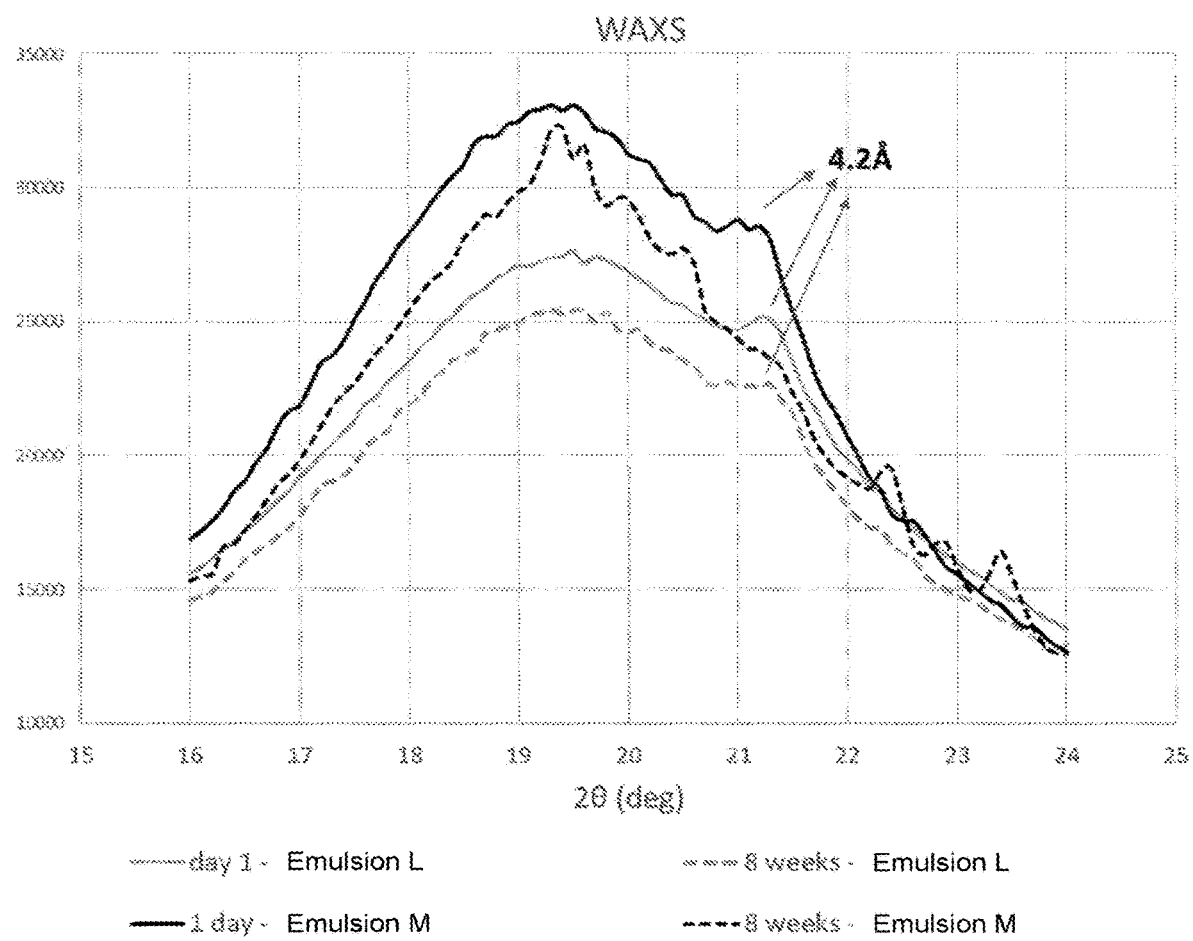
FIG. 7 shows X-ray scattering patterns of structured emulsions both in accordance with and not in accordance with the invention taken at day 1 and over an 8-week period of storage.

X-ray scattering patterns of Emulsions L and M were collected in the range of 1°<2θ<8° and 16°<2θ<24°, at a rate of 0.1°/min using a Rigaku MultiFlex powder X-ray diffractometer outfitted with a copper X-ray tube (Cu-K α1, λ=1.5418 Å) operating at 40 kV and 44 mA, and are shown in FIG. 7. The apparatus was set with a 0.5° divergence slit, 0.5° scattering slit, and a 0.3 mm receiving slit. Analysis was performed by spreading the shortening on a circular-welled aluminium slide, which served as the sample holder in the XRD apparatus. For all samples, data acquisition was performed at room temperature (20° C.).

In the wide angle region (WAXS), both emulsions exhibit a single characteristic peak with an associated d-spacing of ~4.2 Å after 1 day. Over the course of an 8-week storage at 20° C., Emulsion L maintained this same WAXS pattern, indicating no or limited change in the molecular organization of the emulsion according to the invention. In contrast, Emulsion M began to show changes in the WAXS pattern. This change manifested as a depression in the peak with a d-spacing of 4.2 Å, and appearance of several other peaks at various locations within the amorphous peak. This indicates a shift from the alpha-gel phase to the coagel (beta-gel) phase in comparative Emulsion M.

Example 6

A pilot trial (100 kg) was conducted using two vessels equipped with an anchor and a high shear mixer (plate turbine). A structured emulsion according to the present invention was prepared having a composition as follows:
- 50% sunflower oil (approximately 80% oleic acid)
- 4.2% emulsifier (distilled monoglyceride, Dimodan HR 85 S6, comprising 6% by weight of the emulsifier of sodium stearate)
- 24% refined sucrose (EC category 1)
- 21.8% de-ionised water
- Oil to water weight ratio: 2.29

The oil phase (sunflower oil and Dimodan HR 85 S6) and water phase (water and sucrose) were separately heated in two vessels to 75° C. The oil phase was subsequently incrementally added to the water phase under continuous mixing (anchor: 80 rpm; plate turbine: 3050 rpm) for 60 minutes. The mixing was stopped and samples of the final emulsion were taken and stored in separate containers with some samples undergoing intermediate cooling prior to being transferred to their containers. In particular, one sample was transferred without cooling (i.e. at 75° C.) to a container ("hot-filled"), after which the filled container was allowed to cool naturally by the prevailing environmental conditions to 20° C. (Emulsion N). Other samples were taken and instead initially cooled using a plate heat exchanger (supplied by GEA group) to the following temperatures: 50° C. (Emulsion O), 35° C. (Emulsion P) and 25° C. (Emulsion Q), before being transferred to individual containers where further cooling took place by the prevailing environmental conditions to 20° C. in each case. Each of the samples was then maintained at a temperature of 20° C. for a storage time of up to 9 weeks.

The emulsions were analyzed by Differential Scanning calorimetry (DSC) over the course of the storage period to identify the presence of a melting peak at 7-13° C., which is characteristic of the sub-alpha gel phase. The melting enthalpy (J/g) and peak temperature (° C.) for the peak between 7 and 13° C. over time are shown in Table 6 below.

TABLE 6

| | Melting Enthalpy (J/g); peak temperature (° C.) | | | |
|---|---|---|---|---|
| | Emulsion N | Emulsion O | Emulsion P | Emulsion Q |
| 5 weeks | 0.0485 J/g; 10.1° C. | 0.0861 J/g; 104° C. | 0.252 J/g; 11.1° C. | 0.253 J/g; 10.9° C. |

TABLE 6-continued

| | Melting Enthalpy (J/g); peak temperature (° C.) | | | |
|---|---|---|---|---|
| | Emulsion N | Emulsion O | Emulsion P | Emulsion Q |
| 7 weeks | 0.0449 J/g; 9.98° C. | 0.148 J/g; 11.4° C. | 0.216 J/g; 10.1° C. | 0.198 J/g; 10.1° C. |
| 9 weeks | na | na | 0.209 J/g; 10.1° C. | 0.200 J/g; 10.4° C. |

The higher melting enthalpy for the peak between 7 and 13° C. of the emulsions initially cooled to 25-35° C. (Emulsions O to Q) indicate a longer presence of the sub-alpha and alpha phase for the samples. Cooling is therefore advantageous for prolonging retention of the alpha gel phase during storage.

Baking trials were also performed with samples of the Emulsions N to Q after 1 week of storage. Cookie doughs were prepared following the recipe and procedure used in Example 3 above for Emulsion G. No significant differences between the cookie doughs were observed.

Properties of each prepared dough were evaluated for oil loss, as well as dough quality, as described in Example 3 above. The results of the oil loss experiment and the dough assessment are shown in Table 7 below.

TABLE 7

| | Difference in weight filter paper = oil adsorbed (g) | Dough quality score (1 = low; 5 = best) |
|---|---|---|
| Emulsion N | 0.003 | 5 |
| Emulsion O (cooled to 50° C.) | 0.002 | 5 |
| Emulsion P (cooled to 35° C.) | 0.001 | 5 |
| Emulsion Q (cooled to 25° C.) | 0.002 | 5 |

As can be seen from the results in Table 7, the doughs prepared in each case exhibited low oil loss and scored highly in the dough quality assessment.

Example 7

A pilot trial (200 kg) was conducted using two vessels equipped with an anchor and a high shear mixer (plate turbine). A structured emulsion (Emulsion R) according to the present invention was prepared having a composition as follows:
- 60% sunflower oil (approximately 80% oleic acid)
- 5% emulsifier (distilled monoglyceride, Dimodan HR 85 S6, comprising 6% by weight of the emulsifier of sodium stearate)
- 27.3% aqueous sucrose solution (67% sucrose, Raftisweet S100/67/10)
- 7.7% drinking (tap) water
- Oil to water weight ratio: 3.59

The oil phase (sunflower oil and Dimodan HR 85 S6 emulsifier) and water phase (water and sucrose solution) were separately heated in two vessels to 75° C. The oil phase was subsequently incrementally added to the water phase under continuous mixing (anchor: 80 rpm; plate turbine: 3050 rpm) for 150 minutes. The mixing was stopped and the final emulsion was cooled using a plate heat exchanger (GEA group) to 25° C.

Figure 8:
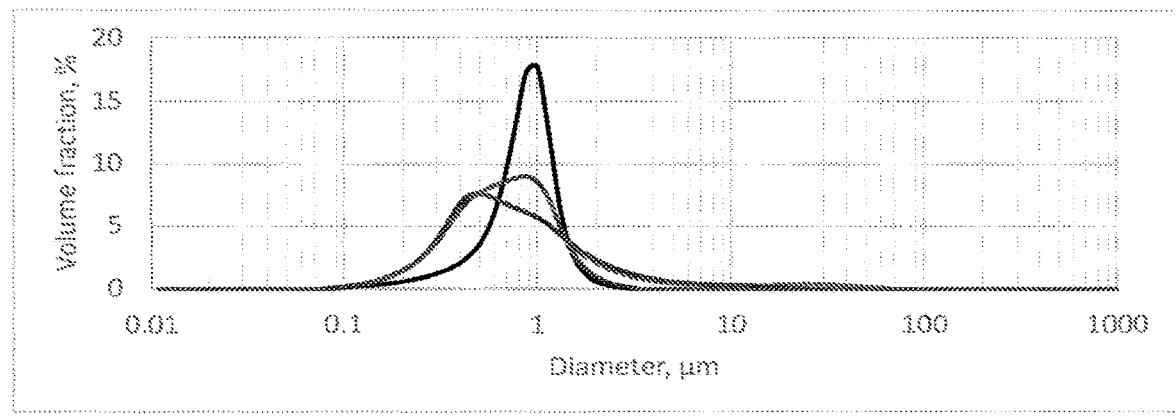
FIG. 8 shows a graph of oil droplet size distribution for a structured emulsion of the invention.

The oil droplet size distribution of Emulsion R was determined using a Horiba LA 960 instrument (conditions: dilution 10% emulsion/90% milli-q water; drop-wise addition to a transmittance of 94% (red laser), 84% (blue laser); circulation speed 6), the results of which are shown below in Table 8 and represented graphically in FIG. 8.

TABLE 8

|  | Emulsion R |
| --- | --- |
| Mean Size, D (3.2) (nm) | 652 |
| D10 (nm) | 206 |
| D50 (nm) | 647 |
| D90 (nm) | 1083 |

Figure 9:
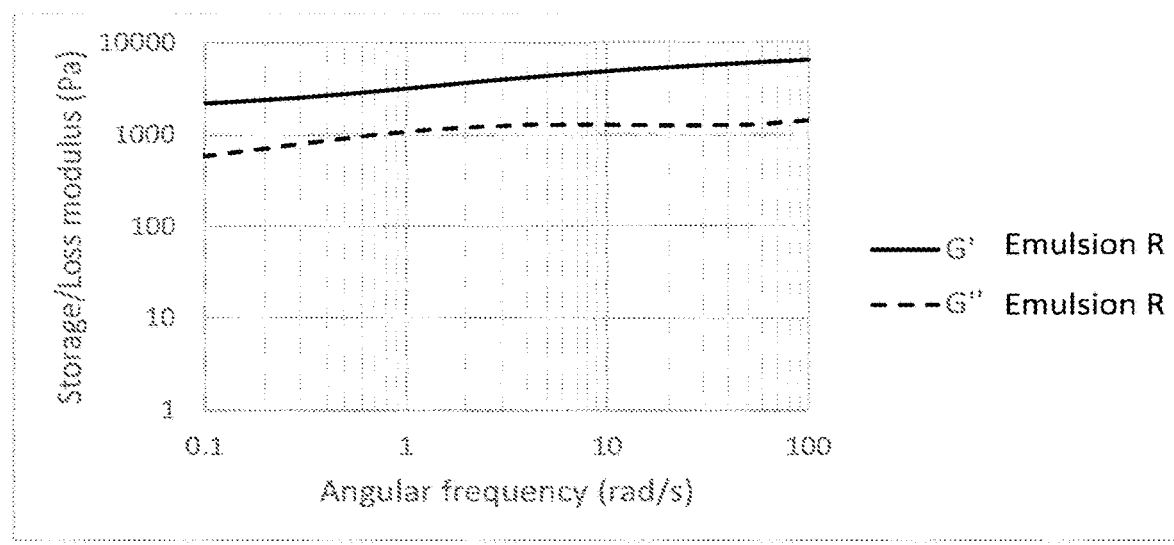
FIG. 9 shows a graph of storage modulus, G', and loss modulus, G", determined for a structured emulsion of the invention.

The storage modulus, G', and the loss modulus, G'', of Emulsion R were determined using an Anton Paar MCR300 rheometer (conditions: 2.5 ml to plate cone geometry; stress sweep at a controlled shear strain at 0.5%), the results of which are shown in FIG. 9.

Emulsion R has a storage modulus, G', which is greater than its loss modulus, G''.

Emulsion R was evaluated after 1 and 2 weeks in a baking trial. Cookie doughs were prepared and baked following the procedure used in Example 3 above for Emulsion G, except using the recipe according to Table 9 below.

TABLE 9

| | | Weight (g) |
| --- | --- | --- |
| Creaming phase | Emulsion R | 250 |
| | Water | 24 |
| | Sugar | 26 |
| Dough up phase | Flour | 385 |
| | Sugar | 70 |
| | Baking powder | 6.2 |
| | Skimmed milk powder | 6.6 |
| | Salt | 4.6 |

Oil loss and dough quality assessments were also carried out for each batch as in Example 3 above and properties of the baked cookies were also determined and the results are shown in Table 10 below.

TABLE 10

|  | Week 1 | Week 2 |
| --- | --- | --- |
| Specific volume after creaming phase (ml/g) | 1.52 | 1.47 |
| Dough quality score (1 = low; 5 = best) | 4.5 | 4.5 |
| Difference in weight filter paper = oil adsorbed (g) | 0.007 | 0.004 |
| Thickness per cookie/baked weight (mm/g) | 0.81 | 0.77 |
| Diameter per cookie/baked weight (mm/g) | 5.04 | 5.01 |
| Specific volume cookie (ml/g) | 1.62 | 1.58 |
| Regularity in baking score (1 = low; 5 = best) | 5 | 5 |

The results show that very good and consistent results are obtained in the baking trials using doughs prepared from Emulsion R stored for both 1- and 2-week periods.

Example 8

Four structured emulsions in accordance with the present invention were prepared using the above general method (Emulsions S to V). The composition of the structured emulsions is shown in Table 11 below.

TABLE 11

|  | Emulsion S | Emulsion T | Emulsion U | Emulsion V |
| --- | --- | --- | --- | --- |
| Rapeseed oil (wt. %) | 50 | 50 | 50 | 50 |
| Deionized water (wt. %) | 21.8 | 21.8 | 21.8 | 21.8 |
| Emulsifier* (wt. %) | 4.2 | 4.2 | 4.2 | 4.2 |
| Refined sucrose** (wt. %) | 24 | 0 | 0 | 0 |
| Dextrose (wt. %) | 0 | 24 | 0 | 0 |
| Sorbitol (wt. %) | 0 | 0 | 24 | 0 |
| Maltitol (wt. %) | 0 | 0 | 0 | 24 |

*Emulsifier: distilled monoglyceride, Dimodan HR 85 S6, comprising 6 wt. % of the emulsifier of sodium stearate
**EC category 1

Figure 10:
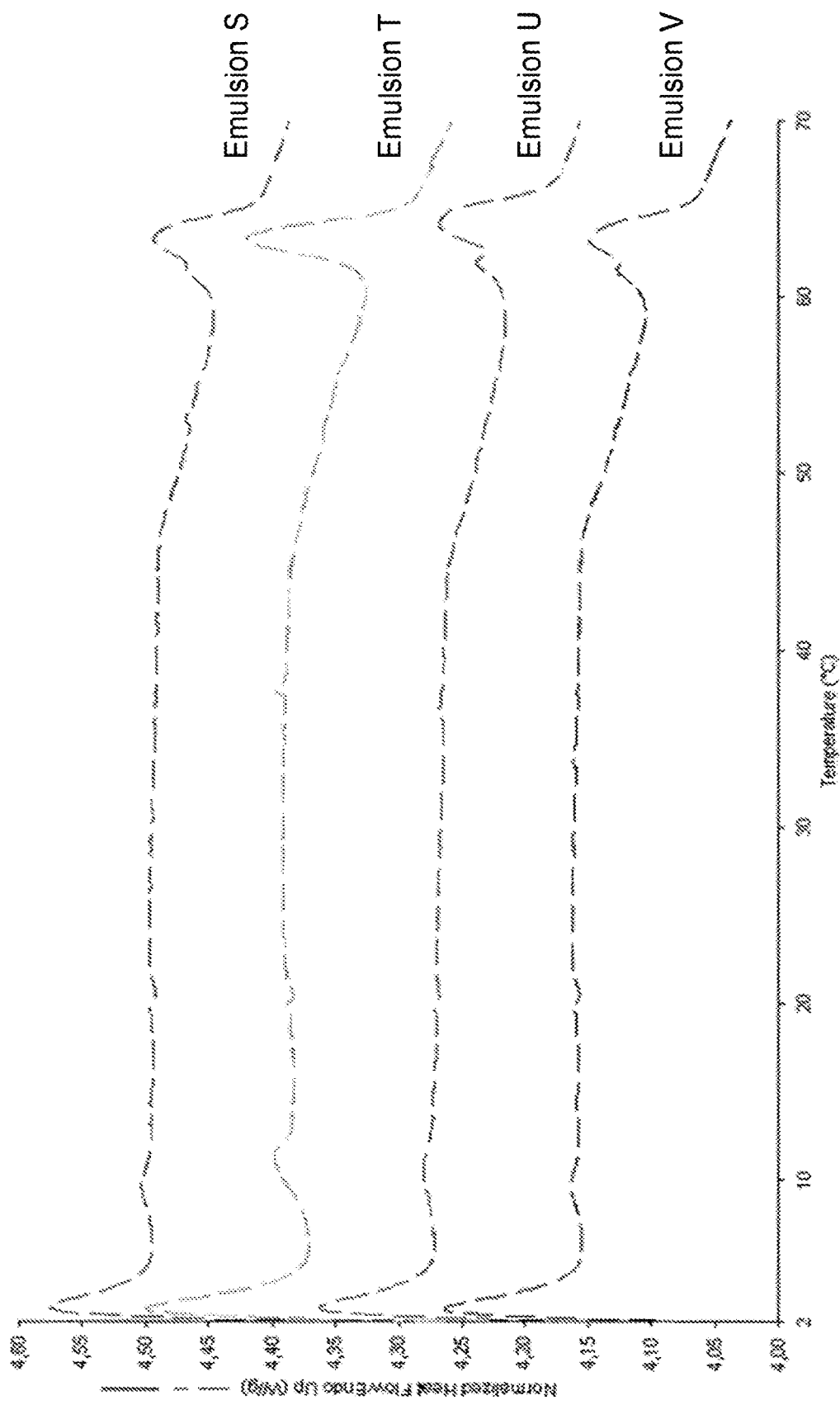
FIG. 10 is a graph showing the results of DSC melting enthalpy assessments of structured emulsions according to the present invention after 35 days of storage at 20° C.

The water activities of Emulsions S, T, U and V were determined to be 0.92, 0.89, 0.88 and 0.92, respectively, using an Aqualab 4TE benchtop water activity meter. The emulsions were then stored for a period of 35 days period at 20° C. in a sealed container, over which time the emulsions were analyzed by Differential Scanning calorimetry (DSC). DSC was used to identify the presence of a melting peak at 7-13° C., which is characteristic of the sub-alpha gel phase. The results are represented graphically in FIG. 10 which shows that after 35 days, the sub-alpha gel phase is present in all samples.

Figure 11:
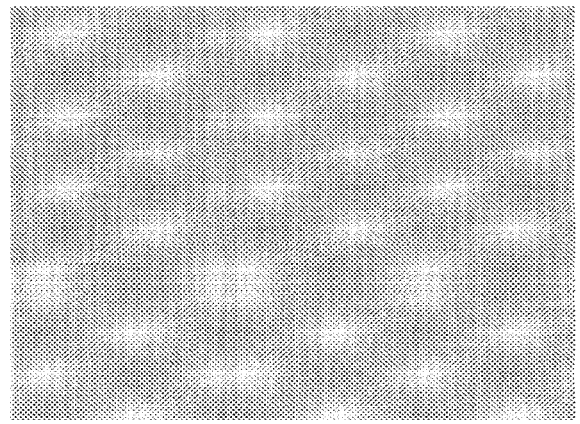
FIGS. 11a to 11h show optical microscope images (×10 and ×40 objective lens) of different samples of structured emulsions according to the present invention.
Figure 11:
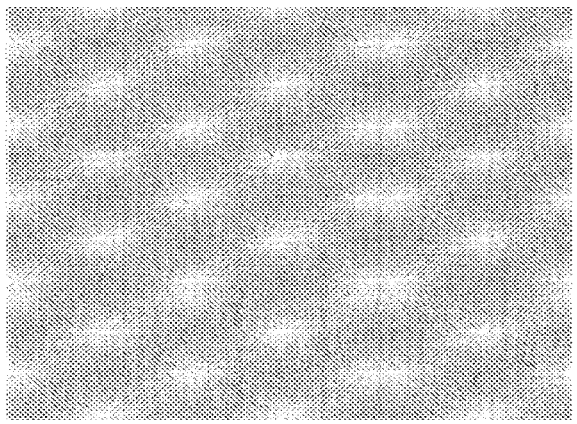
Figure 11:
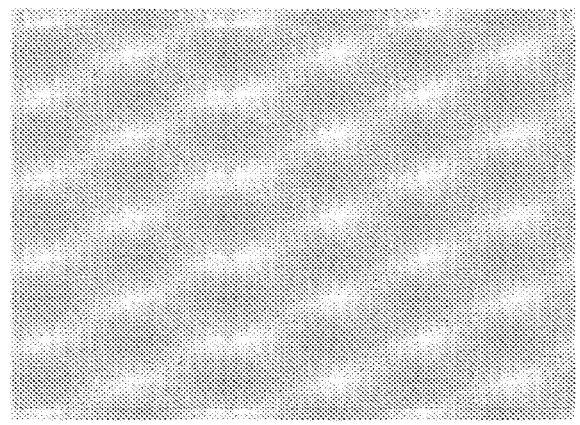
Figure 11:
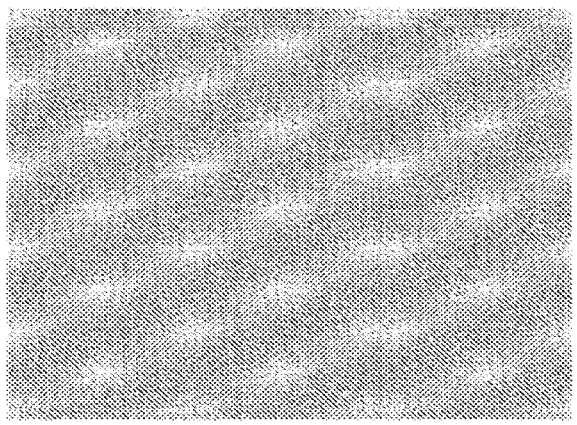
Figure 11:
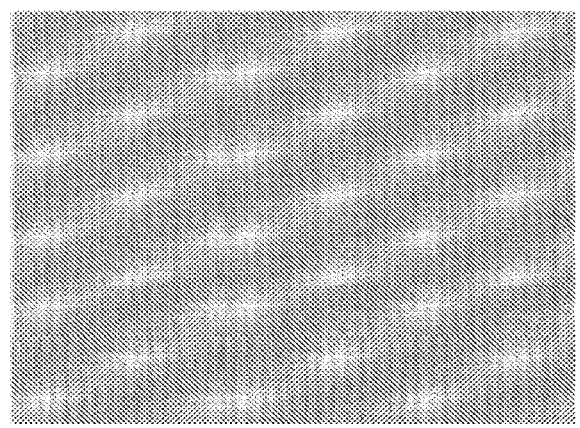
Figure 11:
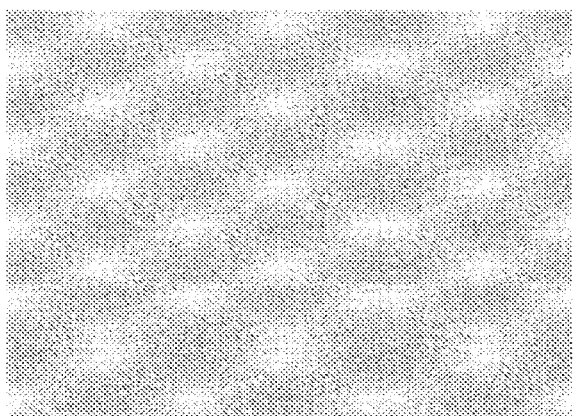
Figure 11:
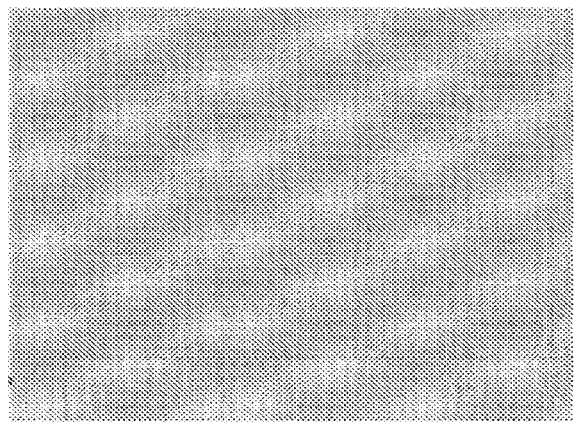
Figure 11:
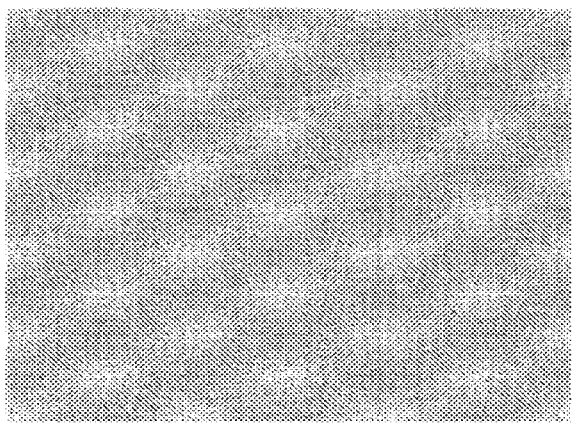

Emulsions S to V were also analyzed by optical microscopy at the end of the 35 day storage period using a Zeiss Axiostar plus microscope (ocular magnifications of ×10 and ×40) and the corresponding microscope images are provided in FIGS. 11a) to 11h) (FIGS. 11a and 11b): Emulsion S at ocular magnifications of ×10 and ×40, respectively; FIGS. 11c) and 11d): Emulsion T at ocular magnifications of ×10 and ×40, respectively; FIGS. 11e) and 11f): Emulsion U at ocular magnifications of ×10 and ×40, respectively; FIGS. 11g) and 11h): Emulsion T at ocular magnifications of ×10 and ×40, respectively). The images show that Emulsions S to V all have a similar oil droplet size. Together with the DSC result, this shows that emulsions prepared with different sugars or sugar alcohols all have an equally good stability over 35 days of storage time.

Following storage of Emulsions S, T, U and V for 35 days at 20° C. in the sealed container, the emulsions were evaluated. Cookie doughs were prepared following the procedure used in Example 3 above for Emulsion G, except using the recipe according to Table 12 below.

TABLE 12

| | | |
|---|---|---|
| Creaming phase | Emulsion | 300 |
| Dough up phase | Flour | 385 |
| | Sugar | 70 |
| | Baking powder | 6.0 |
| | Skimmed milk powder | 6.2 |
| | Salt | 4.5 |

Oil loss and dough quality assessments were carried out for each batch as in Example 3 above and the results are shown in Table 13 below.

TABLE 13

| | Difference in weight filter paper = oil adsorbed (g) | Dough quality score (1 = low; 5 = best) |
|---|---|---|
| Emulsion S | 0.008 | 4.5 |
| Emulsion T | 0.019 | 3.5 |
| Emulsion U | 0.013 | 4.5 |
| Emulsion V | 0.010 | 4 |

As can be seen from the above Table 13, the resistance to oil loss is similar for doughs containing emulsions made with different types of sugar or sugar alcohols used. Oil loss was slightly higher with the cookie dough containing Emulsion T, which was also reflected in the overall dough quality score as doughs containing Emulsions T or U felt more oily then those containing Emulsions S or V.

Figure 12:
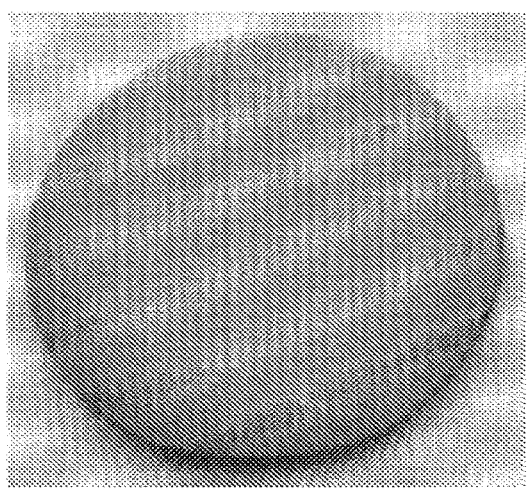
FIGS. 12a to 12d show pictures of cookies containing structured emulsions according to the present invention.
Figure 12:
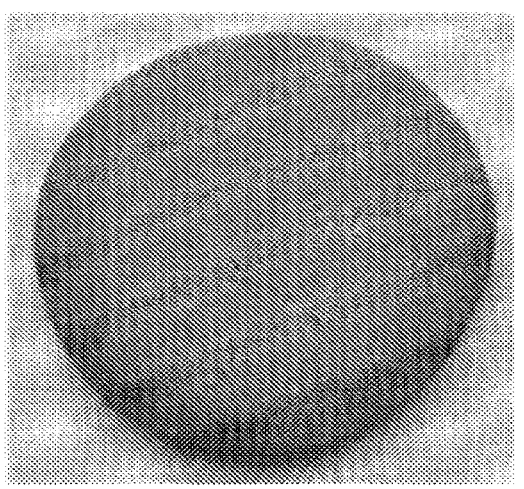
Figure 12:
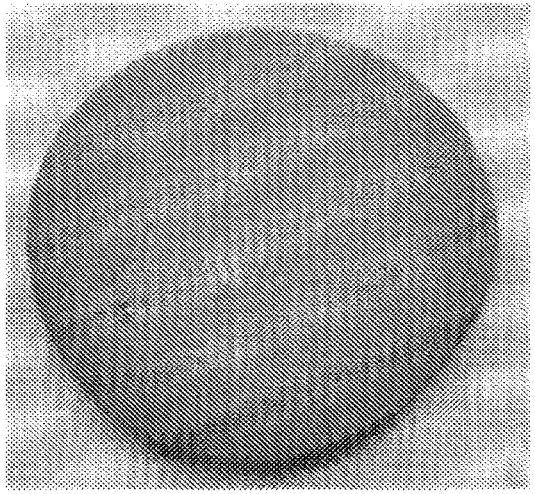
Figure 12:
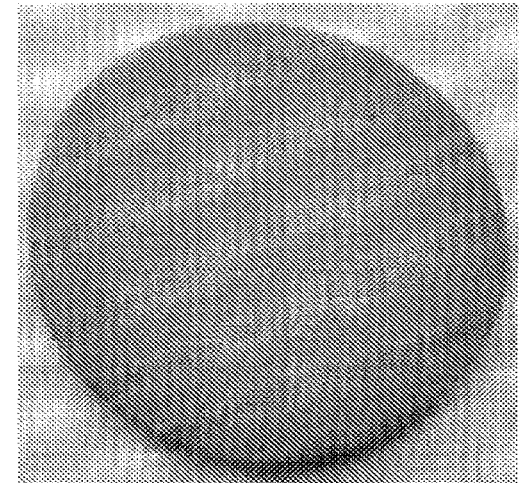

The doughs were further sheeted until 5 mm thickness, round dough pieces with a diameter of 50 mm were cut out and put on a baking tray. Finally, cookies were baked in a deck oven at top/bottom temperature of 180/160° C. for 20 minutes. FIGS. 12a) to 12d) show pictures of cookies respectively containing Emulsions S to V. Although the stability of the mesomorphic phase was similar for each of the four Emulsions S to V, the cookie properties differed in terms of surface smoothness, colour and spread. From the four different cookie recipes prepared with Emulsions S to V, cookies containing Emulsion V had the smoothest surface and most appealing colour.

This example shows that by varying the sugar or sugar alcohol type, emulsions with similar stability are obtained. Furthermore, this can result in a further reduction of water activity (Emulsions T, U) or improved cookie quality (Emulsion V).

Example 9

A pilot trial (200 kg) was conducted using two vessels equipped with an anchor and a high shear mixer (plate turbine). Two structured emulsions (W and X) according to the present invention were prepared having a composition as follows:
- 60% sunflower oil (approximately 80% oleic acid)
- 5% emulsifier (distilled monoglyceride, Dimodan HR 85 S6, comprising 6% by weight of the emulsifier of sodium stearate)
- 27.3% aqueous sucrose solution (67% sucrose, Raftisweet S100/67/10)
- 7.7% drinking (tap) water
- Oil to water weight ratio: 3.59

Figure 13:
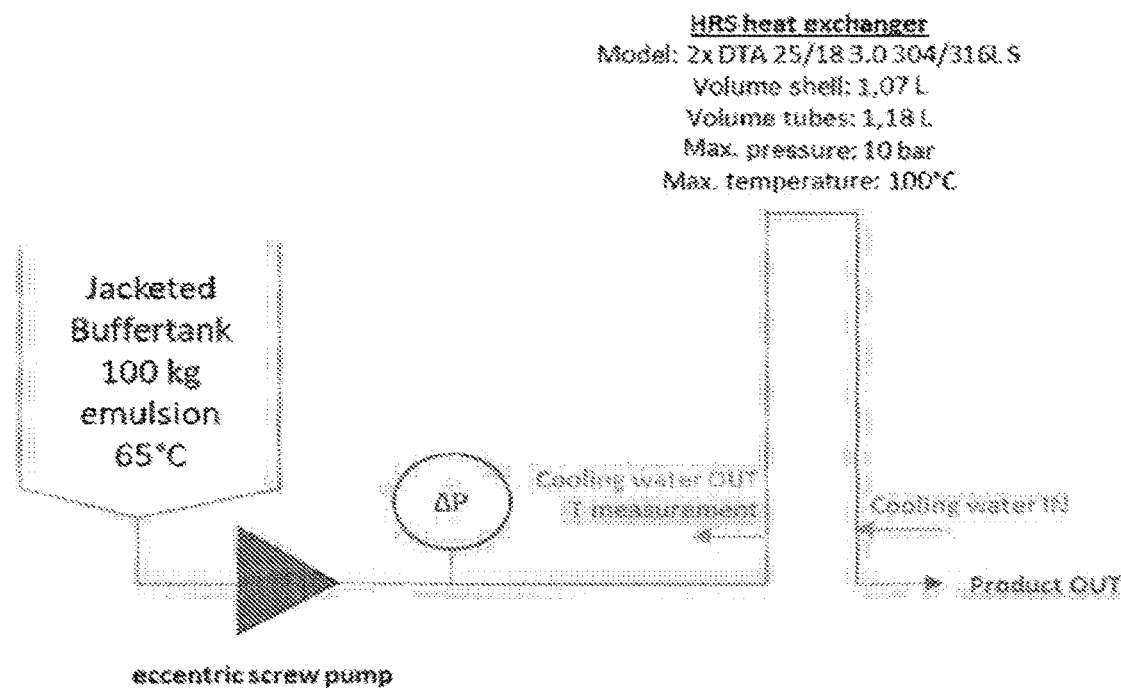
FIG. 13 is a diagrammatic view of the tubular cooler used in Example 9.
Figure 14:
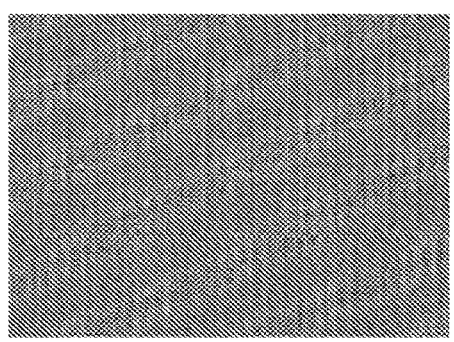
FIGS. 14a to 14d show optical microscope images (×40 objective lens) of different samples of structured emulsions according to the present invention.
Figure 14:
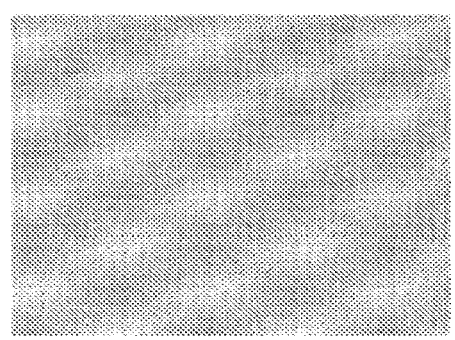
Figure 14:
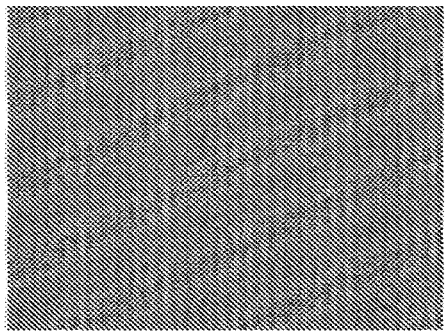
Figure 14:
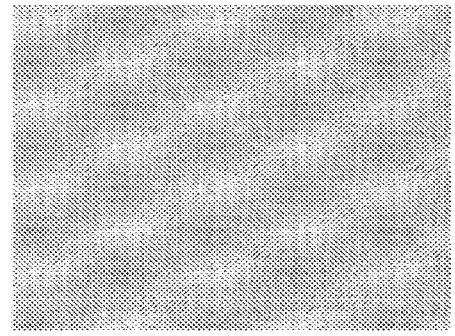

The oil phase (sunflower oil and Dimodan HR 85 S6 emulsifier) and water phase (water and sucrose solution) were separately heated in two vessels to 75° C. The oil phase was subsequently incrementally added to the water phase under continuous mixing (anchor: 80 rpm; plate turbine: 3050 rpm) for 150 minutes. The mixing was stopped and the emulsions were cooled in two different ways:
- Emulsion W was cooled using a scraped surface heat exchanger (Terlotherm DT100: scraper 30 rpm, cooling water 10° C.) to 29° C.
- Emulsion X was cooled using a tubular cooler (two HRS DTA 25/18 3.0 304/316 L S in parallel, cooling water 14° C.—see FIG. 13) to 29° C. This tubular cooler has the following characteristics:
  - 2 units of about 2.7 m in series (total length about 5.4 m), connected by elbow (U-form) and clamps
  - Total shell volume (water): 1.07 L
  - Total tube volume (product): 1.18 L
  - Design pressure: 10 bar; test pressure: 15 bar; ΔP (during production of emulsion X): 5.5 bar
  - Flow cooling water: countercurrent Emulsions W and X were analysed using a Zeiss Axiostar plus microscope (ocular magnifications ×40) and Horiba LA 960 20 instrument (conditions: dilution 10% emulsion/90% milli-q water; drop-wise addition to a transmittance of 94% (red laser), 84% (blue laser); circulation speed 6) for oil droplet distribution, and the corresponding microscope images are provided in FIGS. 14a to d, where it can be seen that oil droplets of Emulsion X were smaller in nature.

Both emulsions have very small oil droplets, but there is a preference for emulsion X because less emulsion breakdown is seen (visually under microscope as well as a smaller increase in mean diameter of the oil droplets after cooling). Emulsion W (see FIGS. 14a and 14c) showed a volume mean diameter D[4,3] (μm) increase of 46% (0.94 to 1.37), whereas Emulsion X (see FIGS. 14b and 14d) showed a volume mean diameter D[4,3] (μm) increase of only 31% (0.83 to 1.09)

The quality of the emulsions was also followed up for more than 2 months. Cookies were made according to the recipe in Table 9 above and the evaluation is shown below in Table 14:

TABLE 14

| | Days | | | | | | | |
|---|---|---|---|---|---|---|---|---|
| | 4 | 11 | 25 | 30 | 39 | 48 | 57 | 67 |
| | Texture of emulsion (g)* | | | | | | | |
| Emulsion W | 133 | 133 | — | — | 153 | — | — | — |
| Emulsion X | 151 | 170 | 174 | — | 174 | — | — | 197 |

TABLE 14-continued

| | Days | | | | | | | |
|---|---|---|---|---|---|---|---|---|
| | 4 | 11 | 25 | 30 | 39 | 48 | 57 | 67 |
| Cookie dough quality (score 1 = low-5 = best) | | | | | | | | |
| Emulsion W | — | 4.5 | — | 4.5 | 3.5 | — | 2 | — |
| Emulsion X | — | 5 | 5 | — | 5 | 5 | — | 5 |
| Cookie surface smoothness (score 1 = low-5 = best)** | | | | | | | | |
| Emulsion W | — | 5 | — | 4 | 4 | — | 1 | — |
| Emulsion X | — | 5 | 5 | — | 5 | 5 | — | 5 |
| Oiling out of dough (difference in weight filter paper = g oil absorbed) | | | | | | | | |
| Emulsion W | — | 0.015 | — | 0.034 | 0.008 | — | 0.411 | — |
| Emulsion X | — | 0.011 | 0.008 | — | 0.011 | 0.008 | — | 0.004 |

*Texture analyser probe P25
**cookie smoothness: from score 1 (very uneven, large bubbles or cracks) to score 5 (smooth surface, no cracks or bubbles)

Emulsion W is functional for 30 to 40 days, after which the emulsion starts to suffer form excess oiling out of the cookie dough, low dough quality and too many cracks in the cookie surface. In contrast, Emulsion X is functional for more than 67 days.

Example 10

A structured emulsion (Emulsion Y) in accordance with the present invention was prepared using the above general method. The composition of the structured emulsion was as follows:
50 wt. % high oleic sunflower oil
4.2 wt. % emulsifier (distilled monoglyceride, Dimodan HR 85 S6, comprising 6% by weight of the emulsifier of sodium stearate)
21.8 wt. % de-ionized water
24 wt. % sugar Palm oil was pre-crystallised (votated) by means of scraped surface heat exchangers.

Cocoa cookie doughs were prepared using the recipe provided in Table 15 below.

TABLE 15

| | | Weight (g) | |
|---|---|---|---|
| | | Comparative | Invention |
| CREAMING PHASE | Emulsion Y | 0 | 381 |
| | Palm oil (votated) | 181 | 0 |
| | Water | 98 | 0 |
| | Sugar | 206 | 0 |
| DOUGH UP PHASE | Flour | 465 | 465 |
| | Dark cocoa powder | 25 | 25 |
| | Sugar | 0 | 125 |
| | Salt | 6.1 | 6.1 |
| | Skimmed milk powder | 8.4 | 8.4 |
| | Baking powder | 8.2 | 8.2 |

The creaming phase for the comparative example followed different steps:
Combine sugar (refined, EC category 1) and palm oil and mix in a Hobart Mixer apparatus with a flat beater for 1 minute at Speed 1; and
Add water and mix further for 1 min at speed 1 and another 3 minutes at speed 2.

The creaming phase in case of the invention was prepared by mixing in a Hobart Mixer with a flat beater for 1 minute at Speed 1 followed by 1 minute at Speed 2.

The dough up phase of dry ingredients were in each case blended and sieved before being added to the corresponding prepared creaming phase. The resulting mixture was then mixed with the Hobart Mixer for 1 minute at Speed 1 to form a dough.

The dough was rolled out until a height/thickness of 5 mm. Round dough pieces were cut (diameter 5 cm) and baked for 20 minutes in a deck oven at 180° C. (top)/160° C. (bottom).

The lightness (L*) of the cookies was followed up over time using a Byk colorimeter (Table 16).

TABLE 16

| Time | L*-values | |
|---|---|---|
| (days) | Palm oil | Emulsion Y |
| 0 | 26.4 | 27.6 |
| 1 | 26.7 | 27.7 |
| 9 | 27.6 | 27.1 |
| 16 | 28.4 | 27.6 |
| 24 | 28.4 | 27.4 |
| 31 | 28.9 | 27.7 |
| 36 | 29.8 | 27.7 |
| 50 | 29.6 | 27.4 |
| 64 | 30.2 | 27.7 |

The cookies made with palm oil have a higher L* value over time (lighter), due to the formation of visible fat crystals on the surface of the cookies, often referred to as 'fat blooming'.

The cookies made with the Emulsion Y have a very stable color over time. There is no fat blooming over time on the surface of the cookies.

The invention claimed is:
1. An oil-in-water emulsion consisting of:
i) from 1 to 8 wt. % emulsifier;
ii) from 8 to 55 wt. % of sugar and/or sugar alcohol;

iii) from 12 to 40 wt. % water; and
iv) from 25 to 70 wt. % oil;
wherein the emulsion is structured and
the emulsifier consists of a non-ionic emulsifier and an ionic emulsifier, wherein the weight ratio of the non-ionic emulsifier to the ionic emulsifier is from 70:30 to 99:1.

2. The emulsion according to claim 1, wherein the emulsifier is present in an amount of from 2 to 7 wt. %.

3. The emulsion according to claim 1, wherein the oil to water weight ratio is from 1.0 to 5.0.

4. The emulsion according to claim 1, wherein the sugar and/or sugar alcohol is present in an amount from 10 to 40 wt. %.

5. The emulsion according to claim 1, wherein the emulsion consists of sugar.

6. The emulsion according to claim 1, wherein the non-ionic emulsifier is selected from the group consisting of monoglycerides, propylene glycol fatty acid esters, polyglycerol fatty acid esters, and combinations thereof.

7. The emulsion according to claim 1, wherein the ionic emulsifier or non-ionic emulsifier consists of at least one monoglyceride.

8. The emulsion according to claim 1, wherein the ionic emulsifier is selected from the group consisting of acid esters of mono- and diglycerides, fatty acids and metal salts thereof, anionic lactylated fatty acid salts, and combinations thereof.

9. The emulsion according to claim 8, wherein the ionic emulsifier is selected from the group consisting of stearic acid, sodium stearate, sodium palmitate, palmitic acid, sodium stearoyl lactylate, a diacetyl tartaric acid ester of a monoglyceride, and combinations thereof.

10. The emulsion according to claim 1, wherein the emulsifier consists of an ionic emulsifier selected from the group consisting of stearic acid, sodium stearate and sodium stearoyl lactylate and a non-ionic emulsifier consisting of a monoglyceride.

11. The emulsion according to claim 1, wherein the sugar is a monosaccharide selected from the group consisting of glucose, fructose, xylose, ribose, galactose, mannose, arabinose, allulose, tagatose; a disaccharide selected from sucrose, maltose, trehalose, lactose, lactulose, isomaltulose, kojibiose, nigerose, cellobiose, gentiobiose, sophorose; an oligosaccharide selected from oligofructose, galacto oligosaccharides, raffinose, or a combination thereof.

12. The emulsion according to claim 1, wherein the sugar alcohol is selected from the group consisting of ethylene glycol, glycerol, erythritol, sorbitol, xylitol, maltitol, mannitol, lactitol, and combinations thereof.

13. The emulsion according to claim 1, wherein the emulsion has a water activity of 0.90 or lower.

14. The emulsion according to claim 1, wherein the emulsion retains a water activity of 0.90 or below after storage for 28 days or 55 days at a temperature of less than 30° C.

15. The emulsion according to claim 1, wherein the emulsion consists of oil droplets having an equivalent surface area mean diameter of from 0.1 to 3.0 µm, as measured by dynamic light scattering (DLS).

16. The emulsion according to claim 1, wherein the oil is selected from the group consisting of a vegetable oil, a marine oil, an animal oil, and combinations thereof.

17. The emulsion according to claim 1, wherein the oil consists of a vegetable oil, wherein the vegetable oil is selected from the group consisting of açai oil, almond oil, beech oil, cashew oil, coconut oil, colza oil, corn oil, cottonseed oil, flaxseed oil, grapefruit seed oil, grape seed oil, hazelnut oil, hemp oil, lemon oil, macadamia oil, mustard oil, olive oil, orange oil, peanut oil, palm oil, palm kernel oil, pecan oil, pine nut oil, pistachio oil, poppyseed oil, rapeseed oil, rice bran oil, safflower oil, sesame oil, shea butter and its fractions, soybean oil, sunflower oil, walnut oil, and wheat germ oil.

18. The emulsion according to claim 1, wherein the emulsion is free of palm oil and/or palm kernel oil.

19. The emulsion according to claim 1, wherein the emulsion is employed as a shortening substitute.

20. The emulsion according to claim 1, wherein the emulsion is employed to reduce fat blooming when used in a bakery product.

21. A process for making an oil-in-water emulsion, comprising:
i) preparing an oil phase by combining oil with the emulsifier, and heating the oil phase;
ii) preparing an aqueous phase by combining water with a sugar component, and heating the aqueous phase;
iii) combining the aqueous phase and the oil phase and mixing to form an emulsion; and
iv) cooling the emulsion by means of a tubular cooler to form a solid comprising surfactant-encapsulated oil layers in a continuous aqueous phase;
wherein the oil-in-water emulsion consists of:
i) from 1 to 8 wt. % emulsifier;
ii) from 8 to 55 wt. % of sugar and/or sugar alcohol;
iii) from 12 to 40 wt. % water; and
iv) from 25 to 70 wt. % oil;
wherein the emulsion is structured and
the emulsifier consists of a non-ionic emulsifier and an ionic emulsifier, wherein the weight ratio of the non-ionic emulsifier to the ionic emulsifier is from 70:30 to 99:1.

22. A process according to claim 21, wherein the oil phase and/or aqueous phase is heated to a temperature of 40° C. to 90° C.

23. A process according to claim 21, wherein the oil phase and the aqueous phase are heated to the same temperature.

24. A process according to claim 21, wherein the emulsion is cooled to a temperature below 40° C.

25. A process according to claim 21, wherein the emulsion is cooled to a temperature in the range of 0 to 35° C.

26. A food product comprising an oil-in-water emulsion consisting of:
i) from 1 to 8 wt. % emulsifier;
ii) from 8 to 55 wt. % of sugar and/or sugar alcohol;
iii) from 12 to 40 wt. % water; and
iv) from 25 to 70 wt. % oil;
wherein the emulsion is structured and
the emulsifier consists of a non-ionic emulsifier and an ionic emulsifier, wherein the weight ratio of the non-ionic emulsifier to the ionic emulsifier is from 70:30 to 99:1.

* * * * *